United States Patent
Yao

(10) Patent No.: US 10,621,486 B2
(45) Date of Patent: Apr. 14, 2020

(54) METHOD FOR OPTIMIZING AN ARTIFICIAL NEURAL NETWORK (ANN)

(71) Applicant: Deephi Technology Co., Ltd., Beijing (CN)

(72) Inventor: Song Yao, Beijing (CN)

(73) Assignee: BEIJING DEEPHI INTELLIGENT TECHNOLOGY CO., LTD., Beijing (CN)

( * ) Notice: Subject to any disclaimer, the term of this patent is extended or adjusted under 35 U.S.C. 154(b) by 816 days.

(21) Appl. No.: 15/242,622

(22) Filed: Aug. 22, 2016

(65) Prior Publication Data

US 2018/0046894 A1  Feb. 15, 2018

(30) Foreign Application Priority Data

Aug. 12, 2016  (CN) .......................... 2016 1 0663201

(51) Int. Cl.
| | |
|---|---|
| G06N 3/04 | (2006.01) |
| G06F 7/544 | (2006.01) |
| G06N 3/063 | (2006.01) |
| G06N 3/08 | (2006.01) |
| G06F 7/483 | (2006.01) |

(52) U.S. Cl.
CPC .............. *G06N 3/04* (2013.01); *G06F 7/483* (2013.01); *G06F 7/5443* (2013.01); *G06N 3/0454* (2013.01); *G06N 3/063* (2013.01); *G06N 3/082* (2013.01); *G06F 2207/4824* (2013.01)

(58) Field of Classification Search
CPC ....................................................... G06N 3/04
See application file for complete search history.

(56) References Cited

U.S. PATENT DOCUMENTS

| | | | |
|---|---|---|---|
| 9,317,482 B2 | 4/2016 | Davis et al. | |
| 10,311,342 B1* | 6/2019 | Farhadi | G06K 9/66 |
| 2016/0328644 A1* | 11/2016 | Lin | G06N 3/08 |
| 2017/0228345 A1* | 8/2017 | Gupta | G06F 17/141 |

FOREIGN PATENT DOCUMENTS

| | | |
|---|---|---|
| CN | 102129397 A | 7/2011 |
| CN | 104915322 A | 9/2015 |
| CN | 105488565 A | 4/2016 |
| CN | 205139973 U | 4/2016 |
| CN | 105681628 A | 6/2016 |
| CN | 105760933 A | 7/2016 |

OTHER PUBLICATIONS

Qiu et al., Going Deeper with Embedded FPGA Platform for Convolutional Neural Network, Feb. 2016, FPGA '16, pp. 26-35 (Year: 2016).*

(Continued)

*Primary Examiner* — Alan Chen
(74) *Attorney, Agent, or Firm* — IPro, PLLC

(57) ABSTRACT

The present invention relates to artificial neural network, for example, convolutional neural network. In particular, the present invention relates to how to implement and optimize a convolutional neural network based on an embedded FPGA. Specifically, it proposes an overall design process of compressing, fix-point quantization and compiling the neural network model.

20 Claims, 15 Drawing Sheets

(56) References Cited

OTHER PUBLICATIONS

Guo et al., Angel-Eye: A Complete Design Flow for Mapping CNN onto Customized Hardware, 2016, IEEE Computer Society Annual Symposium on VLSI, pp. 24-29 (Year: 2016).*
Chung et al., Simplifying Deep Neural Networks for Neuromorphic Architectures, Jun. 2016, DAC '16, 6 total pages (Year: 2016).*
Gysel, Ristretto: Hardware-Oriented Approximation of Convolutional Neural Networks, May 2016, UC Davis Master Thesis published on arXiv, 73 total pages (Year: 2016).*
Han et al., EIE: Efficient Inference Engine on Compressed Deep Neural Network, 2016, ACM/IEEE 43rd Annual International Symposium on Computer Architecture, pp. 243-254 (Year: 2016).*
Zhang et al., Optimizing FPGA-based Accelerator Design for Deep Convolutional Neural Networks, 2015, FPGA '15, pp. 161-170 (Year: 2015).*
Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]//Interspeech. 2014: 338-342.
16. Long short-term memory based recurrent neural network architectures for large vocabulary speech recognition[J]. arXiv preprint arXiv:1402.1128, 2014.
18. Deep compression: Compressing deep neural networks with pruning, trained quantization and Huffman coding.
19. Diannao: A small-footprint high-throughput accelerator for ubiquitous machine-learning.
21. Dadiannao: A machine-learning supercomputer.
22. Shidiannao: shifting vision processing closer to the sensor.
23. DSD: Regularizing Deep Neural Networks with Dense-Sparse-Dense Training Flow in NIPS 2016.
Learning both Weights and Connections for Efficient Neural Networks, arXiv:1506.02626v3 [cs.NE] Oct. 30, 2015.
2. Reconfigurable pipelined 2-d convolvers for fast digital signal processing.
12. A dynamically configurable coprocessor for convolutional neural networks.
3. Second order derivatives for network pruning: Optimal brain surgeon.
5. Cnp: An fpga-based processor for convolutional networks.
5. Optimizing fpga-based accelerator design for deep convolutional neural networks.
7. Pudiannao: A polyvalent machine learning accelerator.
8. DSD: Regularizing Deep Neural Networks with Dense-Sparse-Dense Training Flow in NIPS 2016.
9. Long Short-term Memory, Neural Computation 9(8)1735-80—Dec. 1997, DOI: 10.1162/neco.1997.9.8.1735.

* cited by examiner (a) Operations demanded in different layers (GOP)

(b) Number of weights in different layers (Million)

METHOD FOR OPTIMIZING AN ARTIFICIAL NEURAL NETWORK (ANN)

CROSS REFERENCE TO RELATED APPLICATIONS

This application claims priority to Chinese Patent Application Number 201610663201.9 filed on Aug. 12, 2016, the entire content of which is incorporated herein by reference.

TECHNICAL FIELD

The present invention relates to artificial neural network, for example, convolutional neural network. In particular, the present invention relates to how to implement and optimize a convolutional neural network based on an embedded FPGA.

BACKGROUND ART

Artificial neural network (ANN), in particular, convolutional neural network (CNN) has achieved great success in various fields. For example, in the field of computer vision (CV), CNN is widely used and most promising.

Image classification is a basic problem in computer vision (CV). In recent years, Convolutional Neural Network (CNN) has led to great advances in image classification accuracy. In Image-Net Large-Scale Vision Recognition Challenge (ILSVRC) 2012, Krizhevsky et al. showed that CNN had great power by achieving the top-5 accuracy of 84.7% in classification task, which was significantly higher than other traditional image classification methods. In the following years, the accuracy has been improved to 88.8%, 93.3%, and 96.4% in ILSVRC 2013, 2014, and 2015.

While achieving state-of-the-art performance, CNN-based methods demand much more computations and memory resources compared with traditional methods. In this manner, most CNN-based methods have to depend on large servers. However, there has been a non-negligible market for embedded systems which demands capabilities of high-accuracy and real-time object recognition, such as auto-piloted car and robots. But for embedded systems, the limited battery and resources are serious problems.

To address this problem, many researchers have proposed various CNN acceleration techniques from either computing or memory access aspects. For example, C. Zhang, P. Li, G. Sun, Y. Guan, B. Xiao, and J. Cong, "Optimizing fpga-based accelerator design for deep convolutional neural networks"; T. Chen, Z. Du, N. Sun, J. Wang, C. Wu, Y. Chen, and O. Temam, "Diannao: A small-footprint high-throughput accelerator for ubiquitous machine-learning"; Y. Chen, T. Luo, S. Liu, S. Zhang, L. He, J. Wang, L. Li, T. Chen, Z. Xu, N. Sun, "Dadiannao: A machine-learning supercomputer"; D. Liu, T. Chen, S. Liu, J. Zhou, S. Zhou, O. Teman, X. Feng, X. Zhou, and Y. Chen, "Pudiannao: A polyvalent machine learning accelerator"; Z. Du, R. Fasthuber, T. Chen, P. Ienne, L. Li, T. Luo, X. Feng, Y. Chen, and O. Temam, "Shidiannao: shifting vision processing closer to the sensor"; S. Chakradhar, M. Sankaradas, V. Jakkula, and S. Cadambi, "A dynamically configurable coprocessor for convolutional neural networks"; C. Farabet, B. Martini, B. Corda, P. Akselrod, E. Culurciello, and Y. LeCun, "Neuflow: A runtime reconfigurable dataflow processor for vision", C. Farabet, C. Poulet, J. Y. Han, and Y. LeCun, "Cnp: An fpga-based processor for convolutional networks".

However, most of previous techniques only considered small CNN models such as the 5-layer LeNet for simple tasks such as MNIST handwritten digits recognition.

State-of-the-art CNN models for large-scale image classification have extremely high complexity, and thus can only be stored in external memory. In this manner, memory bandwidth becomes a serious problem for accelerating CNNs especially for embedded systems. Besides, previous research focused on accelerating Convolutional (CONV) layers, while the Fully-Connected (FC) layers were not well studied.

Consequently, it is desired to go deeper with the embedded FPGA platform to address these problems.

SUMMARY

In the present invention, we propose a solution to implement a complete CNN in a FPGA embedded accelerator.

First, after an in-depth analysis of state-of-the-art CNN models for large-scale image classification, we find that state-of-the-art CNN models are extremely complex, CONV layers are computational-centric, and FC layers are memory-centric.

According to one aspect of the invention, we present an automatic flow for dynamic-precision data quantization and explore various data quantization configurations. Results show that only a 0.4% accuracy loss is introduced with VGG16 model under 8/4 bit dynamic-precision quantization.

It proposes a method for optimizing an Artificial Neural Network (ANN), said ANN at least comprises convolutional layers CONV 1, CONV 2, . . . CONV n, and fully connected layers FC 1, FC 2, . . . , FC m, wherein n and m are positive integers, said ANN can receive a data set as input and process said data set by said CONV 1, . . . CONV n, FC 1, . . . FC m in sequence and provide a corresponding feature map set as each layer's output, said method comprising: compressing step for compressing weights of said convolutional layers CONV 1, CONV 2, . . . CONV n, and fully connected layers FC 1, FC 2, . . . FC m of said ANN; fix-point quantization step for converting floating-point numbers into fixed-point numbers, including: weight quantization step, for converting weights of said convolutional layers CONV 1, CONV 2, . . . CONV n, and fully connected layers FC 1, FC 2, . . . , FC m of the compressed ANN from floating-point numbers into fixed-point numbers, wherein the numerical range of quantization is dynamically chosen for different layers while remains static in one layer; data quantization step, for converting data of feature map sets j from floating-point numbers into fixed-point numbers, wherein the numerical range of quantization is dynamically chosen for different feature map sets while remains static in one feature map set, wherein said feature map sets j are output by said CONV layers and FC layers of said ANN; compiling step, for compiling said compressed ANN to generate instructions to be executed by an ANN accelerator, so as to implement said ANN on said ANN accelerator; wherein the compiling step is conducted on the basis of the quantized weights of CONV and FC layers of said ANN, and the chosen quantization numerical range for respective feature map sets output by said CONV and FC layers.

According to another aspect of the invention, we propose a specific hardware designed to support dynamic-precision data quantization.

It proposes a deep processing unit (DPU) for implementing an Artificial Neural Network (ANN), comprising: a CPU, configured for scheduling a programmable logic module; an external memory, configured for storing weights and instructions of the ANN and input data to be processed by said ANN; a direct memory access (DMA), connected to the external memory, directly configured by the CPU for communication between the external memory and the programmable logic module; a programmable logic module, comprising: a controller, configured for getting instructions from the external memory and scheduling operations of a computing complex on the basis of the instructions; a computing complex, including a plurality of processing elements (PEs), configured for performing operations on the basis of the instructions, weights, and data; an input buffer, configured for preparing the input data, weights and instructions for the computing complex; an output buffer, configured for storing intermediate data and calculation results of the computing complex.

According to yet another aspect of the invention, we propose an ANN accelerator design on an embedded FPGA platform for Image-Net large-scale classification.

On the Xilinx Zynq platform, our system achieves the performance at 187.8 GOP/s and 137.0 GOP/s for CONV layers and full CNN under 150 MHz frequency respectively. With VGG16-SVD network, our implementation achieves a top-5 accuracy of 86.66% at a 4.45 fps speed.

EMBODIMENTS OF THE INVENTION

Some content of the present application has been proposed by the inventor in a previous paper "Going Deeper With Embedded FPGA Platform for Convolutional Neural Network" (FPGA 2016.2). In the present application, the inventor proposes further improvements on the basis of the previous paper.

In order to illustrative the concepts of the present invention, the application explains how CNN is applied in image processing, e.g., image classification/prediction. Other Artificial Neural Network, such as DNN and RNN, can be improved and implemented in a similar manner.

Concepts of CNN

Figure 1A:
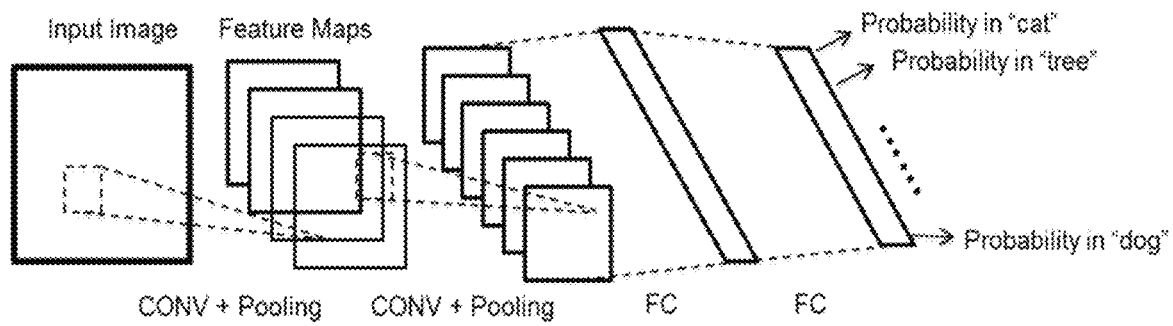
FIG. 1A shows a typical CNN according to the present invention.

As shown in FIG. 1A, a typical CNN consists of a number of layers that run in sequence.

The parameters of a CNN model are called "weights". The first layer of a CNN reads an input image and outputs a series of feature maps. The following layers read the feature maps generated by previous layers and output new feature maps. Finally a classifier outputs the probability of each category that the input image might belong to.

CONV layer and FC layer are two essential types of layer in CNN. After CONV layers, there are usually pooling layers.

For a CNN layer, $f_j^{in}$ denotes its j-th input feature map, $f_i^{out}$ denotes the i-th output feature map, and $b_i$ denotes the bias term to the i-th output map.

For CONV layers, $n_{in}$ and $n_{out}$ represent the number of input and output feature maps respectively.

For FC layers, $n_{in}$ and $n_{out}$ are the length of the input and output feature vector.

A CONV layer takes a series of feature maps as input and convolves with convolutional kernels to obtain the output feature map.

A nonlinear layer, which applies nonlinear activation function to each element in the output feature maps is often attached to CONV layers.

The CONV layer can be expressed with Equation 1:

$$f_i^{out} = \sum_{j=1}^{n_{in}} f_j^{in} \otimes g_{i,j} + b_i \quad (1 \leq i \leq n_{out}) \qquad (1)$$

where $g_{i,j}$ is the convolutional kernel applied to j-th input feature map and i-th output feature map.

FC layer applies a linear transformation on the input feature vector:

$$f^{out} = W f^{in} + b \qquad (2)$$

where W is an $n_{out} \times n_{in}$ transformation matrix and b is the bias term. It should be noted, for the FC layer, the input is not a combination of several 2-D feature maps but just a feature vector. Consequently, in Equation 2, the parameter $n_{in}$ and $n_{out}$ actually corresponds to the lengths of the input and output feature vector.

Pooling layer, which outputs the maximum or average value of each subarea in each feature maps, is often attached to the CONV layer. Max-pooling can be expressed as Equation 3:

$$f_{i,j}^{out} = \max_{p \times p} \begin{pmatrix} f_{m,n}^{in} & \cdots & f_{m,n+p-1}^{in} \\ \vdots & & \vdots \\ f_{m+p-1,n}^{in} & \cdots & f_{m+p-1,n+p-1}^{in} \end{pmatrix} \qquad (3)$$

where p is the pooling kernel size. This non-linear "down sampling" not only reduces the feature map size and the computation for later layers, but also provides a form of translation invariance.

CNN can be used to classify images in a forward inference process. But before using the CNN for any task, one should first train the CNN on a dataset. Recent research showed that, a CNN model pre-trained on a large dataset for a given task can be used for other tasks and achieved high accuracy with minor adjustment in network weights. This minor adjustment is called "fine-tune". The training of the CNN is mostly implemented on large servers. For embedded FPGA platform, we only focus on accelerating the inference process of a CNN.

Image-Net Dataset

Image-Net dataset is regarded as the standard benchmark to evaluate the performance of image classification and object detection algorithms. So far Image-Net dataset has collected more than 14 million images within more than 21 thousand categories. Image-Net releases a subset with 1.2 million images in 1000 categories for the ILSVRC classification task, which has significantly promoted the development of CV techniques. In this paper, all the CNN models are trained with ILSVRC 2014 training dataset and evaluated with ILSVRC 2014 validation set.

State-of-the-Art CNN Models

In ILSVRC 2012, the SuperVision team won the first place in image classification task using AlexNet by achieving 84.7% top-5 accuracy. CaffeNet is a replication of AlexNet with minor changes. Both of AlexNet and CaffeNet consist of 5 CONV layers and 3 FC layers.

The Zeiler-and-Fergus (ZF) network achieved 88.8% top-5 accuracy and won the first place in image classification task of ILSVRC 2013. The ZF network also has 5 CONV layers and 3 FC layers.

The VGG model achieved a top-5 accuracy of 92.6% and won the second place in

TABLE 1 # of layers in VGG models.

| Model | CONV Group 1 | CONV Group 2 | CONV Group 3 | CONV Group 4 | CONV Group 5 | FC | Total |
|---|---|---|---|---|---|---|---|
| VGG11 | 1 | 1 | 2 | 2 | 2 | 3 | 11 |
| VGG16 | 2 | 2 | 3 | 3 | 3 | 3 | 16 |
| VGG19 | 2 | 2 | 4 | 4 | 4 | 3 | 19 | image classification task of ILSVRC 2014. VGG model consists of 5 CONV layer groups and 3 FC layers. According to the exact number of layers, there are several versions of the VGG model including VGG11, VGG16, and VGG19, as listed in Table 1.

Figure 1B:
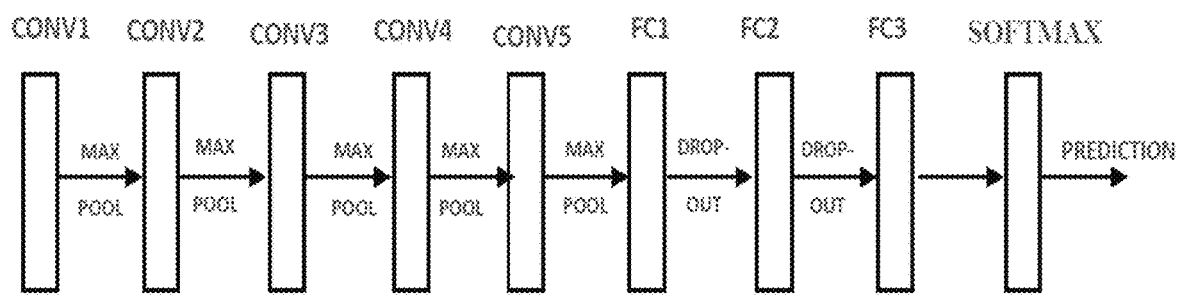
FIG. 1B shows an illustration of how CONV layers, FC layers of a CNN are connected in serial, and how feature maps are processed through these layers.

As shown in FIG. 1B, from a perspective of signal flow, a typical CNN consists of a number of layers that run in sequence.

There are five CONV groups, CONV 1, CONV 2, CONV 3, CONV 4, CONV 5, each comprising 3 CONV layers, total of which are 15 CONV layers. A pooling layer is attached after each CONV group. After the CONV layers, there are three FC layers, FC1, FC2 and FC 3. A softmax function is arranged after the FC layers to give predictions.

Complexity Analysis of CNN

Time complexity of a layer in CNN can be evaluated by the number of multiplication operations in the inference process. In a CONV layer, each convolutional kernel is a k×k filter applied to a r×c dimension input feature map. The number of kernels equals to $n_{in} \times n_{out}$. Consequently, according to Equation 1, the complexity of this CONV layer is $$C_{CONV}^{Time} = O(n_{in} \cdot n_{out} \cdot k^2 \cdot r \cdot c) \quad (4)$$

For pooling layers and FC layers, the time complexities are $$C_{Pooling}^{Time} = O(n_{in} \cdot r \cdot c) \quad (5)$$

$$C_{FC}^{Time} = O(n_{in} \cdot n_{out}) \quad (6)$$

For pooling layers, $n_{out}$ equals to $n_{in}$ since each input feature map is pooled to a corresponding output feature map, and thus the complexity is linear to either input or output feature map number.

Space complexity refers to the memory footprint. For a CONV layer, there are $n_{in} \times n_{out}$ convolution kernels, and each kernel has $k^2$ weights. Consequently, the space complexity for a CONV layer is $$C_{CONV}^{Space} = O(n_{in} \cdot n_{out} \cdot k^2) \quad (7)$$

FC layer actually applies a multiplication to the input feature vector, and thus the complexity for FC layer is measure by the size for the parameter matrix, which is shown in Equation 8:

$$C_{FC}^{Space} = O(n_{in} \cdot n_{out}) \quad (8)$$

No space is needed for pooling layers since it has no weight.

Figure 2:
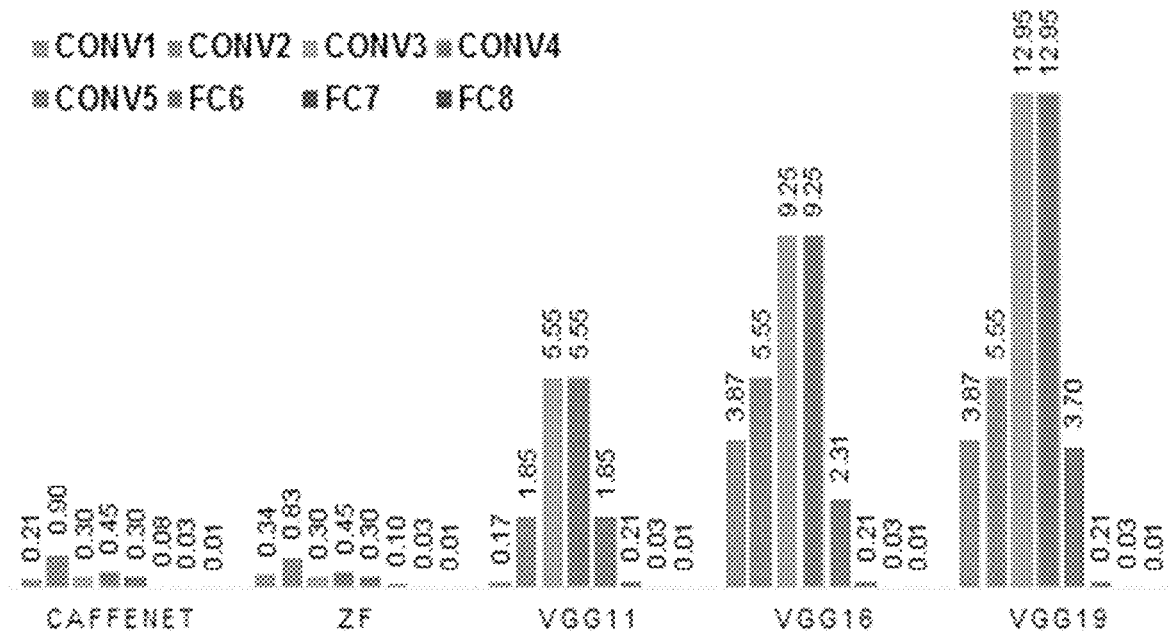
FIG. 2 shows the distribution of demanded operations and weight numbers in the inference process of state-of-the-art CNN models.
Figure 2:
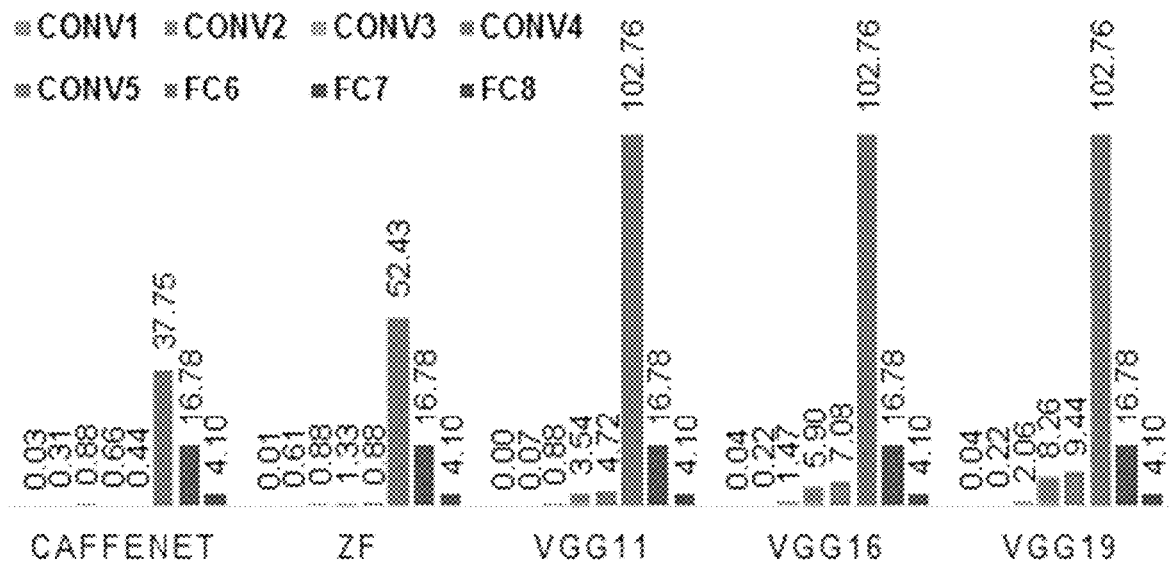

FIG. 2 shows the distribution of demanded operations and weight numbers in the inference process of state-of-the-art CNN models. The measured operations consist of multiplications, adds, and non-linear functions.

As shown in FIG. 2A, the operations of CONV layers compose most of the total operations of CNN models, and thus the time complexity of CONV layers is much higher than that of FC layers. Consequently, for CONV layers, more attention should be paid to accelerate convolution operations.

As shown in FIG. 2B, for space complexity, the situation is quite different. FC layers contribute to most of the weights. Since each weight in FC layers is used only once in one inference process, leaves no chance for reuse, the limited bandwidth can significantly degrade the performance since loading those weights may take quite long time.

Figure 3:
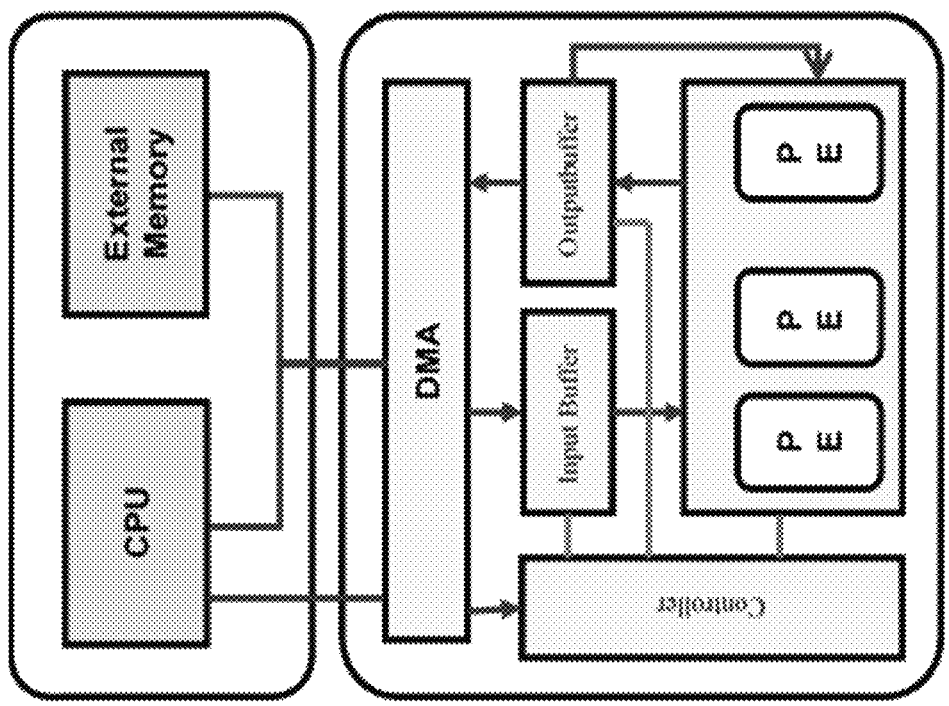
FIG. 3 shows a simplified solution proposed by the present invention.
Figure 3:
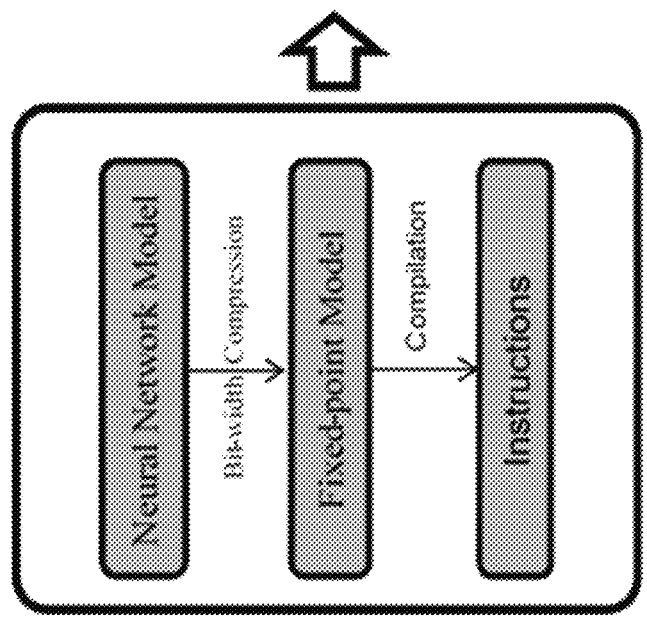
Figure 3:
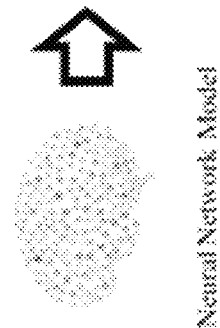

As shown in FIG. 3, the inventor proposes an overall solution for accelerating CNN in order to address the problems in the prior art.

At the left end of FIG. 3, it shows an Artificial Neural Network (ANN), such as a CNN, which is to be optimized and implemented by the present invention. In FIG. 3, it is input into the optimization flow shown in the middle.

In the middle of FIG. 3, it shows how to optimize a CNN from the algorithm perspective, in order to reduce both memory and computation resources it requires to implement a CNN, while suffer minimum loss of accuracy.

In the right end of FIG. 3, it shows how to implement a CNN from a hardware perspective. The optimized CNN is input to the special ANN accelerator and implemented thereon.

Figure 4A:
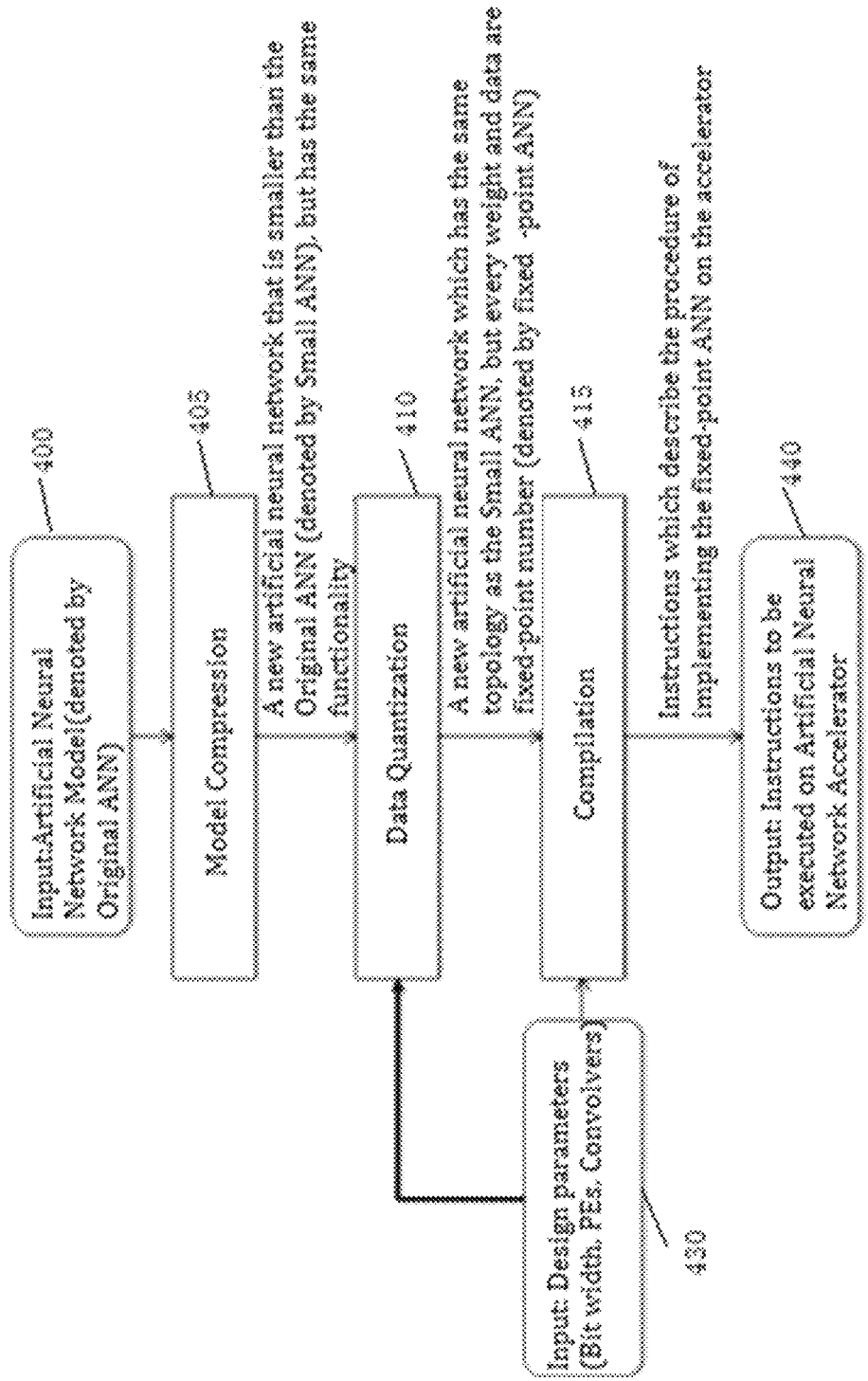
FIG. 4A shows the flow process for optimizing a CNN model according to one aspect of the present invention.

FIG. 4A shows an overall flow of optimizing a CNN.

In FIG. 4A, an original CNN is input.

Step 405: compression

According to the present invention, the compressing step 405 comprises pruning the CNN.

Network pruning is proposed to compress CNN models. In the known art, network pruning proved to be a valid way to reduce the network complexity and over-fitting. For example, refer to B. Hassibi and D. G. Stork, "Second order derivatives for network pruning: Optimal brain surgeon".

In S. Han, J. Pool, J. Tran, and W. J. Dally, "Learning both weights and connections for efficient neural networks", Han et al. proposed to prune less influential connections in neural networks, and achieved 9× and 13× compression for CaffeNet and VGG16 model without accuracy loss.

Figure 5:
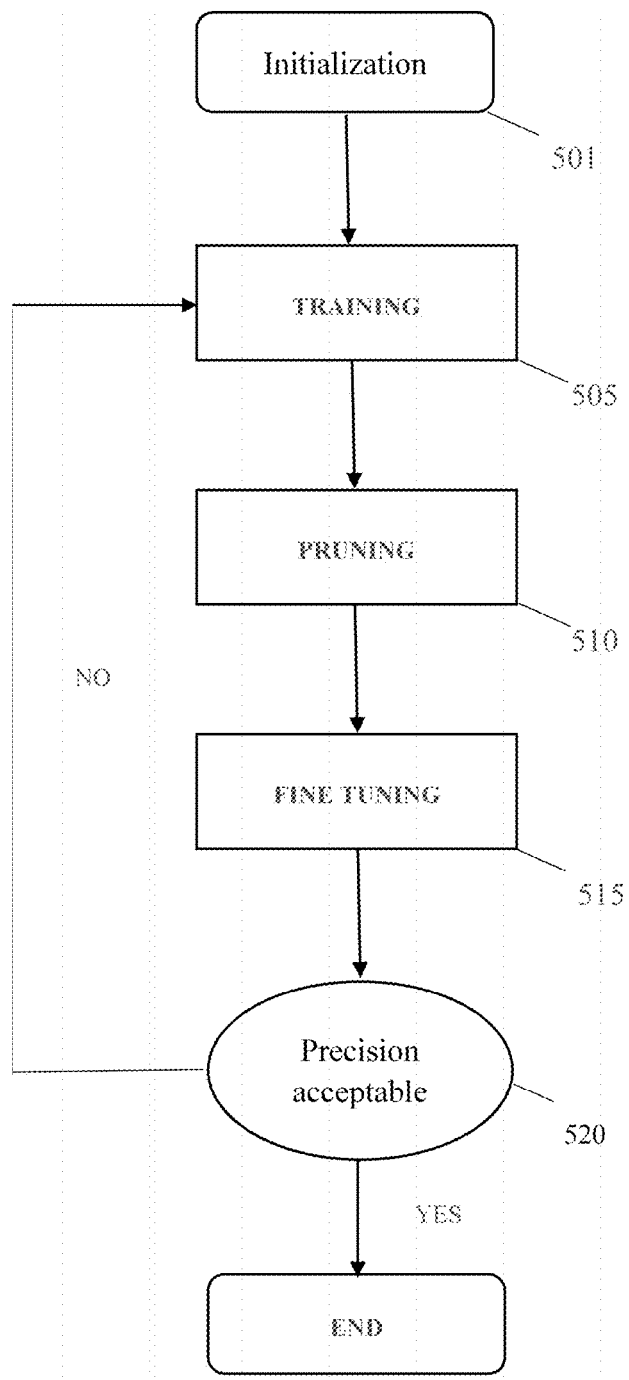
FIG. 5 shows the process of compression in FIG. 4A.

FIG. 5 shows a pruning solution that can be used in the flow 405 of FIG. 4A.

In step 501, initializing said ANN to establish all connections of CONV layers and FC layers, said connections being assigned weights of random values.

In step 505, training said ANN by adjusting weights of ANN until the accuracy of ANN reaches a predetermined level.

According to one embodiment of the present invention, training step 505 uses a stochastic gradient descent algorithm to adjust weights of ANN. For example, the values of weights are stochastically adjusted, and then are chosen based on the gradient descent of ANN's accuracy.

The accuracy of ANN can be measured by, for example, inputting a benchmark test data to the ANN and decide how accurate the prediction results of said ANN is.

In step 510, pruning said ANN to prune insignificant connections, said insignificant connections are decided based on one or more predetermined criteria.

According to one embodiment of the present invention, step 510 uses at least one of the following as said predetermined criteria: if weight of a connection is zero, said connection is insignificant. Or, if weight of a connection is smaller than a threshold, said connection is insignificant.

In step 515, fine-tuning said ANN to restore the pruned connections, and assign zero-value weights to said restored connections.

Next, in step 520, repeating steps 505 to 515, until the accuracy of ANN reaches a predetermined level.

In another embodiment of in the present invention, the Singular Value Decomposition (SVD) is used to compress the weight matrix W.

Since FC layers contribute to most of memory footprint, it is necessary to reduce weights of FC layers while maintaining comparable accuracy. In one embodiment of the present invention, SVD is adopted for accelerating FC layers.

Considering an FC layer $f^{out}=Wf^{in}+b$, the weight matrix W can be decomposed as $W \approx U_d S_d V_d = W_1 W_2$, in which $S_d$ is a diagonal matrix. By choosing the first d singular values in SVD, i.e. the rank of matrix $U_d$, $S_d$, and $V_d$, both time and space complexity can be reduced to $O(d \cdot n_{in} + d \cdot n_{out})$ from $O(n_{in} \cdot n_{out})$. Since accuracy loss may be minute even when d is much smaller than $n_{in}$ and $n_{out}$, considerable reduction of time consumption and memory footprint can be achieved.

Step 410: Fix-Point Quantization

Implementing fixed-point arithmetic units on ASIC and FPGA is much more efficient compared with floating-point ones. Consequently, most of previous ANN accelerators used fixed-point numbers instead of floating-point numbers.

Shorter fixed-point representation of weights and data can also significantly reduce memory footprint and computation resources.

To accelerate large CNN models on the embedded FPGA platform, data quantization is rather important and a shorter representation that introducing negligible accuracy loss is always expected. However, though previous work used data quantization, there is no comprehensive analysis of different quantization strategies.

Using short fixed-point numbers instead of long floating-point numbers is efficient for implementations on the FPGA platform and can significantly reduce memory footprint and bandwidth requirements. A shorter bit width is always wanted, but it may lead to a severe accuracy loss. Though fixed-point numbers have been widely used in ANN accelerator designs, there is no comprehensive investigation on different quantization strategies and the tradeoff between the bit length of fixed-point numbers and the accuracy.

In the present application, we propose a dynamic-precision data quantization flow and compare it with widely used static-precision quantization strategies.

For a fixed-point number, its value can be expressed as $$n = \sum_{i=0}^{bw-1} B_i \cdot 2^{-fl} \cdot 2^i \quad (9)$$

where bw is the bit width of the number and $f_l$ is the fractional length which can be negative.

Figure 6A:
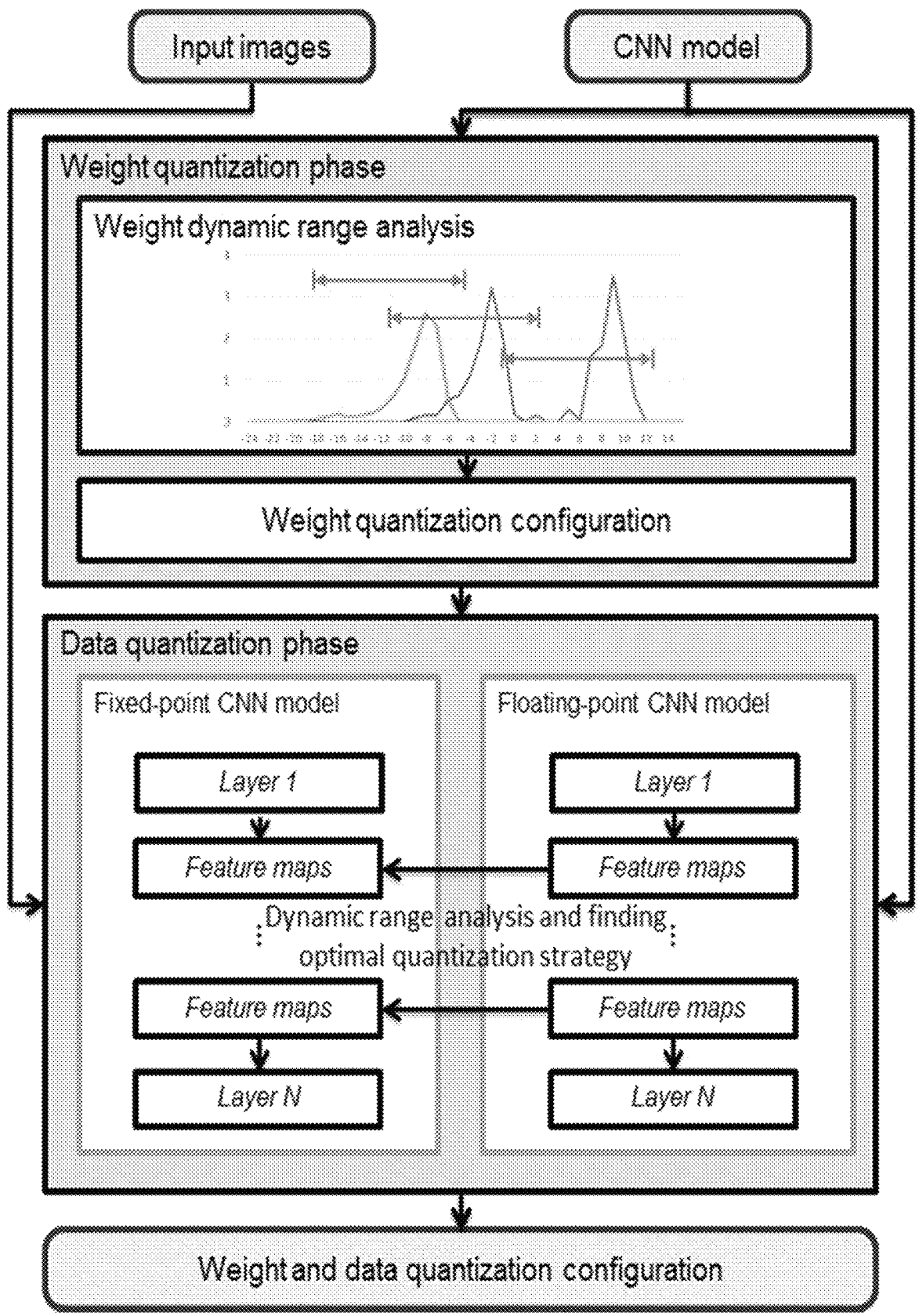
FIGS. 6A and 6B show the process of data quantization in FIG. 4A.

As shown in FIG. 6A, to convert floating-point numbers into fixed-point ones while achieving the highest accuracy, we propose a dynamic-precision data quantization strategy and an automatic workflow.

Unlike previous static precision quantization strategies, in the proposed data quantization flow, $f_l$ is dynamic for different layers and feature map sets while static in one layer to minimize the truncation error of each layer.

Figure 6B:
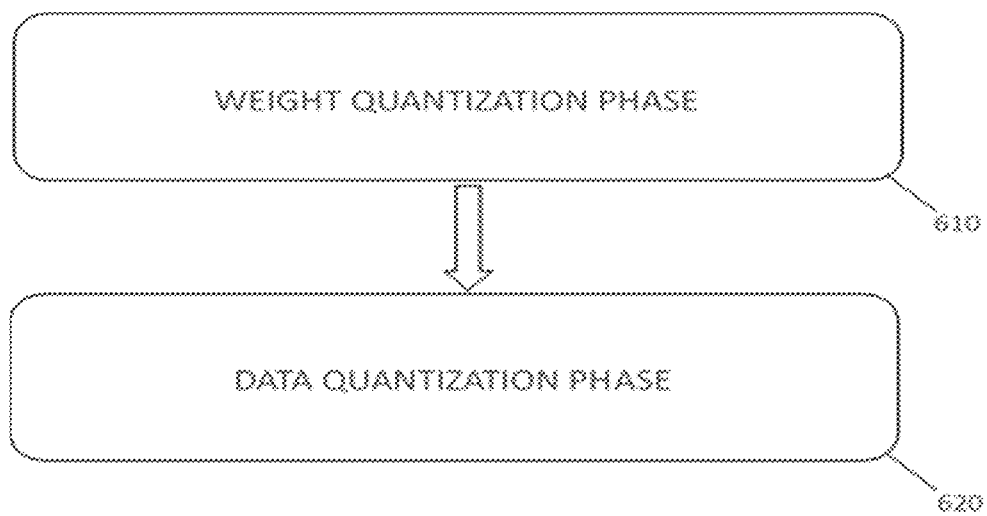

As shown in FIG. 6B, the proposed quantization flow mainly consists of two phases: Step 610: the weight quantization phase, and Step 620: the data quantization phase.

In step 610, the weight quantization phase aims to find the optimal $f_l$ for weights in one layer, as shown in Equation 10:

$$f_l = \underset{f_l}{\arg\min} \sum |W_{float} - W(bw, f_l)| \quad (10)$$

where W is a weight and $W(bw; f_l)$ represents the fixed-point format of W under the given bw and $f_l$ In one embodiment, the dynamic ranges of weights in each layer is analyzed first, for example, by sampling. After that, the $f_l$ is initialized to avoid data overflow. Furthermore, we search for the optimal $f_l$ in the adjacent domains of the initial $f_l$.

In an alternative embodiment, the optimal $f_l$ is decided based on the following Equation 11.

$$f_l = \underset{f_l}{\arg\min} \sum \left| \sum k_i |W_{float_i} - W(bw, f_l)_i| \right| \quad (11)$$

wherein W is the weight matrix of one layer, W (bw, $f_l$) represents the fixed-point format of W under the given bw and $f_l$, i represents one bit out of bw bits, ki represents the weight of said bit i.

In step 620, the data quantization phase aims to find the optimal $f_l$ for a set of feature maps between two layers.

In this phase, the intermediate data of the fixed-point CNN model and the floating-point CNN model are compared layer by layer using a greedy algorithm to reduce the accuracy loss.

For each layer, the optimization target is shown in Equation 12:

$$f_l = \underset{f_l}{\arg\min} \sum |x^+_{float} - x^+(bw, f_l)| \quad (12)$$

In Equation 12, x+ represents the result of a layer when we denote the computation of a layer as $x^+=A \cdot x$. It should be noted, for either CONV layer or FC layer, the direct result $x^+$ has longer bit width than the given standard. Consequently, truncation is needed when optimizing fl selection. Finally, the entire data quantization configuration is generated.

In an alternative embodiment, we use the following Equation 13 to find $f_l$.

$$f_l = \operatorname*{argmin}_{f_l} \sum \left| \sum_N k_i \left| X^+_{float_i} - X^+(bw, f_l)_i \right| \right| \quad (13)$$

wherein $x^+ = A \cdot x$, $A$ represents the operation applied by one of the CONV layers and FC layers of the ANN, $x$ represents the input of one layer, $x+$ represents the output of said layer, $i$ represents one bit out of bw bits, $k_i$ represents the weight of said bit $i$.

In the above example of data quantization, step 610 is conducted before step 620. That is, it finishes weight quantization of all CONV layers and FC layers of the ANN, and then conducts data quantization for each feature map set on the basis of the quantized CONV layers and FC layers.

According to another embodiment of the present invention, it performs weight quantization and data quantization in an alternating (i.e., interleaved) manner.

Specifically, for example, it conducts weight quantization for one of said CONV layers and FC layers in sequence; after conducting weight quantization for the present layer, but before conducting weight quantization for next layer of said CONV layers and FC layers, it conducts data quantization of feature map set output from said present layer.

The inventor explore different data quantization strategies with CaffeNet, VGG16, and VGG16-SVD networks and the results are shown in Table 2. All results are obtained under Caffe framework.

static-precision quantization, no configuration is available since the feature maps between FC layers are quantized to 0. As shown in Exp 8, at least two precisions are needed when using 8-bit quantization and the accuracy degrades greatly in this case.

Results of VGG16 network with dynamic-precision quantization are shown in Exp 9 and Exp 10. When 8-bit dynamic-precision quantization is used for both data and weights, the top-5 accuracy is 87.38%. Using 8/4-bit dynamic-precision quantization for weights in CONV layers and FC layers respectively even achieves higher accuracy. As shown in Exp 10, in this case, the top-5 accuracy is 87.60%.

The results of VGG16-SVD network are shown in Exp 11 to Exp 13. Compared with the floating-point VGG16 model, floating-point VGG16-SVD only introduces 0.04% accuracy loss. However, when 16-bit dynamic-precision quantization is adopted, the top-5 accuracy is down to 86.66%. With 8/4-bit dynamic-precision quantization, the top-5 accuracy further drops to 86.30%.

The results show that dynamic-precision quantization is much more favorable compared with static-precision quantization. With dynamic-precision quantization, we can use much shorter representations of operations while still achieving comparable accuracy. For example, compared with 16-bit quantization, 8/4-bit quantization halves the storage space for intermediate data and reduce three-fourths memory footprint of CNN models. Besides, the utilization of bandwidth can also be significantly increased.

TABLE 2

Exploration of different data quantization strategies with the known CNNs

| | Network | | | | | | | | | | | | |
|---|---|---|---|---|---|---|---|---|---|---|---|---|---|
| | CaffeNet | | | VGG16 | | | | | | | VGG16-SVD | | |
| | | | | Experiment | | | | | | | | | |
| | Exp 1 | Exp 2 | Exp 3 | Exp 4 | Exp 5 | Exp 6 | Exp 7 | Exp 8 | Exp 9 | Exp 10 | Exp 11 | Exp 12 | Exp 13 |
| Data Bits | Single-float | 16 | 8 | Single-float | 16 | 16 | 8 | 8 | 8 | 8 | Single-float | 16 | 8 |
| Weight Bits | Single-float | 16 | 8 | Single-float | 16 | 8 | 8 | 8 | 8 | 8 or 4 | Single-float | 16 | 8 or 4 |
| Data Precision | N/A | Dynamic | Dynamic | N/A | $2^{-2}$ | $2^{-2}$ | Not available | $2^{-5}$ or $2^{-1}$ | Dynamic | Dynamic | N/A | Dynamic | Dynamic |
| Weight Precision | N/A | Dynamic | Dynamic | N/A | $2^{-15}$ | $2^{-7}$ | Not available | $2^{-7}$ | Dynamic | Dynamic | N/A | Dynamic | Dynamic |
| Top 1 Accuracy | 53.90% | 53.90% | 53.02% | 68.10% | 68.02% | 62.26% | Not available | 28.24% | 66.58% | 66.96% | 68.02% | 64.64% | 64.14% |
| Top 5 Accuracy | 77.70% | 77.12% | 76.64% | 88.00% | 87.94% | 85.18% | Not available | 49.66% | 87.38% | 87.60% | 87.96% | 86.66% | 86.30% |

[1] The weight bits "8 or 4" in Exp10 and Exp13 means 8 bits for CONV layers and 4 bits for FC layers.
[2] The data precision "$2^{-5}$ or $2^{-1}$" in Exp8 means $2^{-5}$ for feature maps between CONV layers and $2^{-1}$ for feature maps between FC layers.

For CaffeNet, as shown in Exp 1, the top-5 accuracy is 77.70% when 32-bit floating-point numbers are used. When employing static-precision 16-bit quantization and 8/4-bit dynamic-precision quantization, the top-5 accuracy results are 77.12% and 76.64% respectively.

Figure 7:
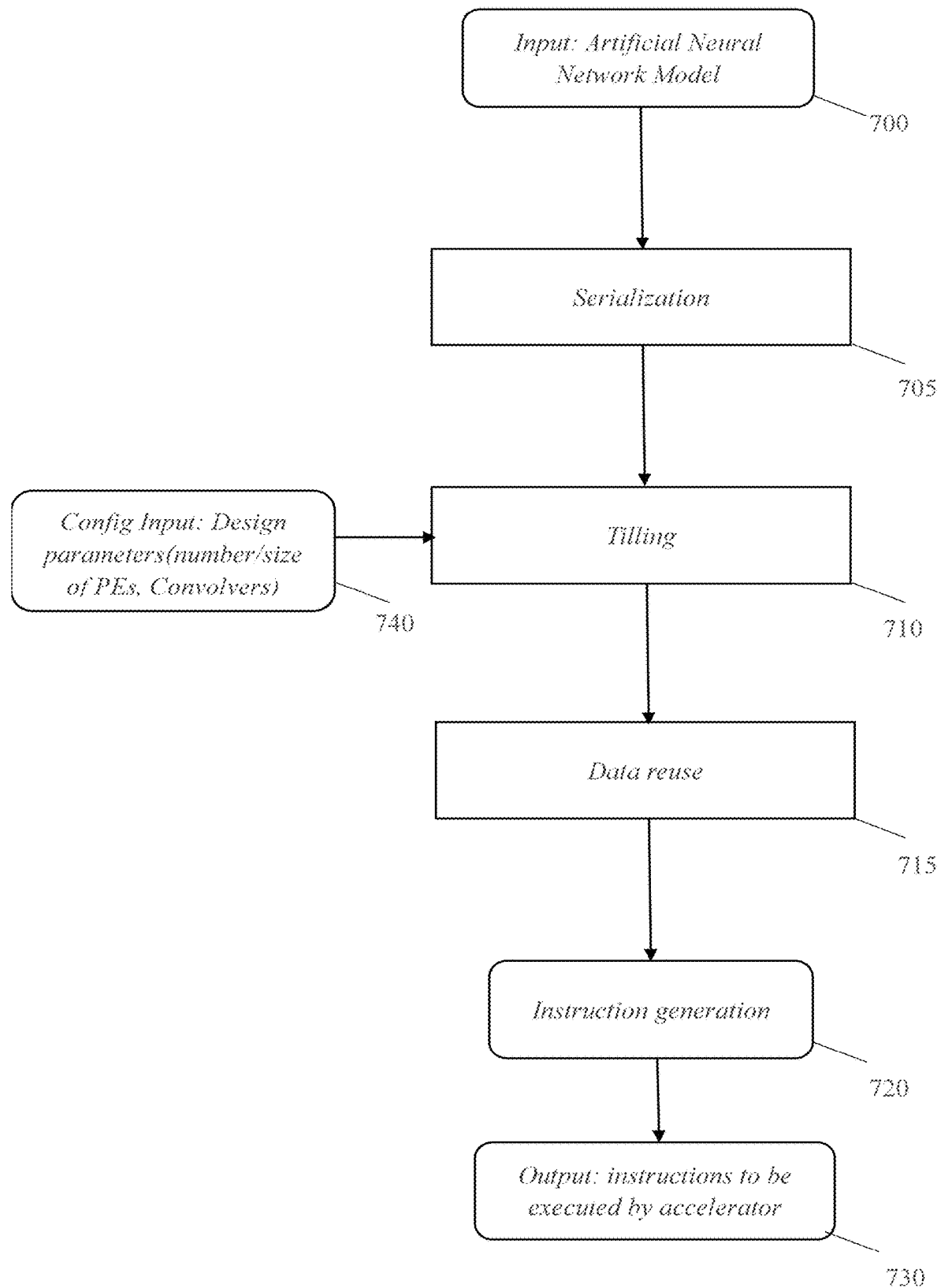
FIG. 7 shows the process of compilation in FIG. 4A.

VGG16 network with static-precision quantization strategies are tested in Exp 4 to Exp 8. As shown in Exp 4, single-float VGG16 network 88.00% top-5 accuracy. When using the 16-bit quantization configuration, only 0.06% accuracy loss is introduced. However, when employing 8-bit Step 415: Compiling FIG. 7 shows an illustrative flow for compiling step 415. The input of FIG. 7 is a CNN that has been quantized.

In serializing step 705, it serializes the CONV layers and FC layers of ANN on the basis of the interdependency among layers, so that the CONV layers and FC layers are arranged in a serial sequence, as shown in FIG. 1B.

In tiling step 710, it tiles the input data based on the computation complexity of each layer of said ANN, computation and memory resources of said ANN accelerator, For example, it tiles the input data by factors (Tr, Tc) in row and column, tiles the feature maps by the factor (Ti, To), wherein Tr, Tc and To are decided based on the computation complexity of CONV layer, computation and memory resources of said ANN accelerator in one operation.

For example, the computation and memory resources of said ANN accelerator includes at least one of the following: number of PEs (Processing Element) in the accelerator, number of convolvers in each PE, or size of convolver.

Assuming the input feature map is N*N, having C channels. For example, RGB image has three channels, and assuming the ANN accelerator can process D channels of input feature maps of M*M at one time, the input data might be tiled into a number of [(N*N)/(M*M)+1]*[(C/D)+1] tiles, wherein [ ] gets the integer of value.

In data reusing step 715, it reuses the tiled data in operations of CONV layers and FC layers.

For example, the data reusing step further comprising: loading the tiled data into buffers of said ANN accelerator, and reusing said tiled data loaded in buffers for convolutional operations in relation to the tiled data.

For input data of feature map M*M*D, it will be stored in on-chip buffers and reused for convolutional operations in multiple calculation.

In instruction generating step 720, it decides data to be loaded and operations to be conducted on the basis of the tiling and data reusing steps, and generating instructions to be executed by said ANN accelerator.

The output of the process shown in FIG. 7 is instructions to be executed by a ANN accelerator so as to implement the CNN.

The instructions output by step 720 are designated as 730, and may be further provided to an ANN accelerator to implement said ANN.

According to one embodiment of the present invention, a compiler is developed on Matlab to automatically generate instructions.

According to another embodiment of the present invention, a configuration step 740 is provided to optimize tiling step 710, and subsequent reusing step 715 and instruction generating step 720. Design parameters are input as configuration parameters for used by tiling. Said design parameters include, for example, number of PEs (Processing Element) in the accelerator, number of convolvers in each PE, or size of convolver.

Table 3 shows the generated the instructions with the example for one CONV layer. It has four phases, wherein the 1st phase (FIRST) is to load data, the 2nd and 3rd phase (Cal) are to conduct task operations, and 4th phase (Last) is to save and output data.

A brief explanation of the instructions are as follows.

Pool Bypass and NL Bypass are used to bypass the Pool and NL module if needed. Said NL module might be a ReLU module.

Zero Switch is used to select either zero or bias data into added to the result of adder tree, since usually more than one phase is needed to calculate the final result and the bias should be added only once.

Result Shift and Bias Shift describe the number of bits and direction for data shifting, used for dynamic data quantization.

Write En is used to switch the data from the Output Buffer either to the external memory or to the PEs to be reused.

PE En offers us the flexibility to set several PEs as idle if needed. This can help save energy when computation capacity meet the demand.

Phase Type helps the Controller to distinguish these phases and send out the corresponding signals, and helps the Controller to distinguish these phases and send out the corresponding signals. Several phases need to be specifically taken care of. For example, for the last phase in the last layer and the last output image, no more weights or data should be loaded in, and the input buffers should be configured differently compared to previous phases.

Pic Num and Tile Size/Layer Type help the Controller to configure the Input Buffer and Output Buffer.

The compiling step 415, which is shown with more details in FIG. 7, will be explained in combination with the hardware structure of FIGS. 8A through 8C hereinafter.

The above brief descriptions explain how to optimize a CNN by compressing 405, data quantizing 410 and compiling 415.

Figure 4B:
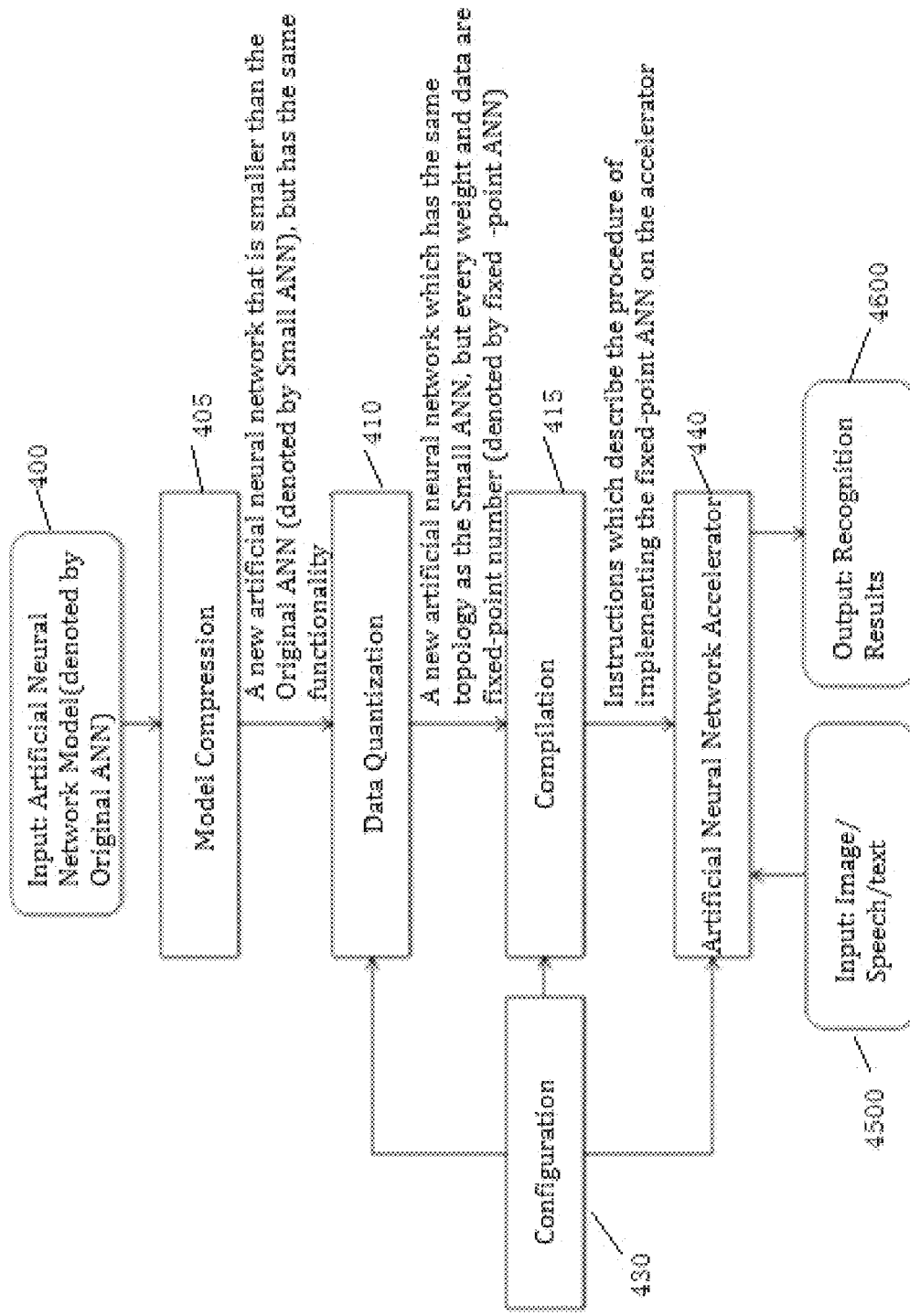
FIG. 4B shows a special designed accelerator for implementing the optimized CNN model according to one aspect of the present invention.

As shown in FIGS. 4A and 4B, according to another embodiment of the present invention, it further comprises the configuration step 430 for inputting design parameters, so as to perform a customized quantizing step 410 and compiling step 415.

In one embodiment, the design parameters include at least a bit width bw from the ANN accelerator used for implementing said ANN. In step 410, it converts floating-point numbers into fixed-point numbers of said bit width bw.

In yet another embodiment, the design parameters include the computation and memory limit of said ANN accelerator. For example, it includes number of PEs (Processing Element) in the accelerator, number of convolvers in each PE, size of convolver. With these parameters, the compiling step 415 may provide a set of customized instructions for said ANN. For example, the tiling and data reusing steps 710 and 715 may help achieve a better utilization of the accelerator's resources with these parameter.

As shown in FIG. 4B, the instructions generated by compiling step 415 is provided to an ANN accelerator 440. The ANN accelerator 440 will execute these instructions to implement said CNN.

TABLE 3

Instructions for One CONV layer generated by the compiler

| Index | Pool Bypass | NL Bypass | Zero Switch | Result Shift | Bias Shift | Write En | PE En | Phase Type | Pic Num | Tile Size | Layer Type |
|---|---|---|---|---|---|---|---|---|---|---|---|
| 1 | X | X | X | X | X | No | 2 | First | 2 | Tr | CONV |
| 2 | Yes | Yes | Bias | X | BS | No | 2 | Cal | 2 | Tr | CONV |
| 3 | No | No | Zero | X | X | PE | 2 | Cal | 2 | Tr | CONV |
| 4 | X | X | X | RS | X | DDR | 2 | Last | 2 | Tr | CONV |

The ANN accelerator 440 receives input data 4500, e.g., voice data, image data or text data, which is to be processed by CNN.

By executing instructions from compiling step 415, the accelerator 440 processes the input data 4500 and output result data 4600. Result data 4600 is the outcome by applying said CNN to the input data. For example, result data 4600 might be a voice/image/text recognition or prediction.

Figure 8A:
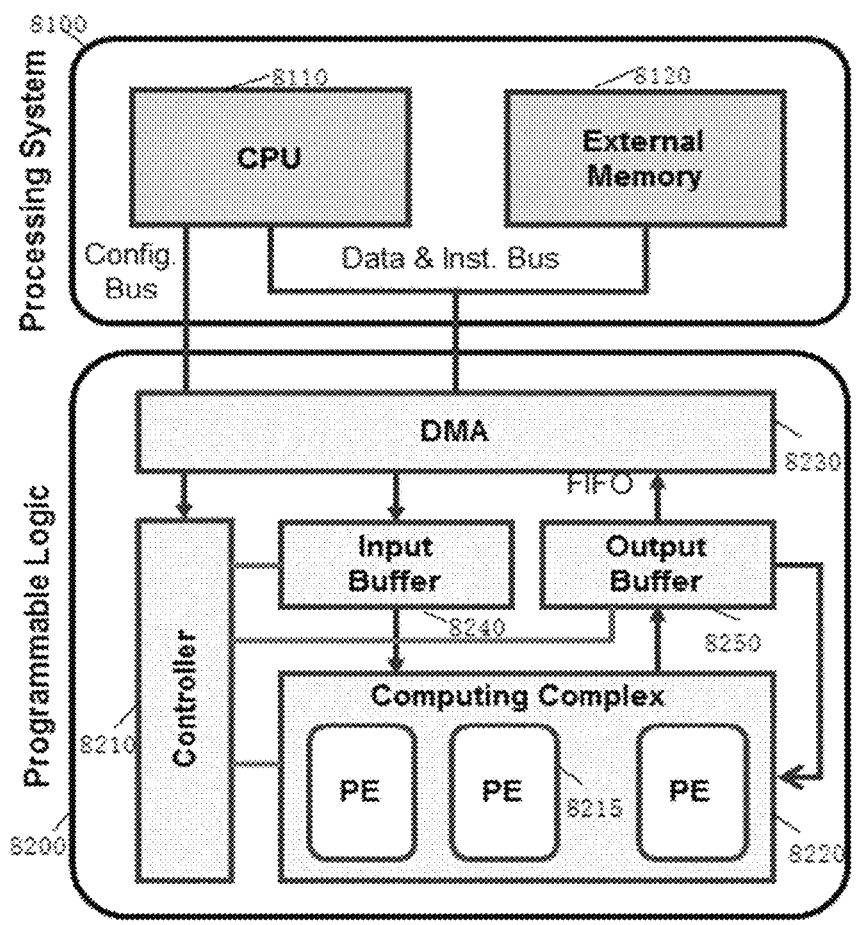
FIG. 8A shows a hardware design specialized for implementing a CNN according to one aspect of the present invention, combining a general processing module and a programmable logic module.
Figure 8B:
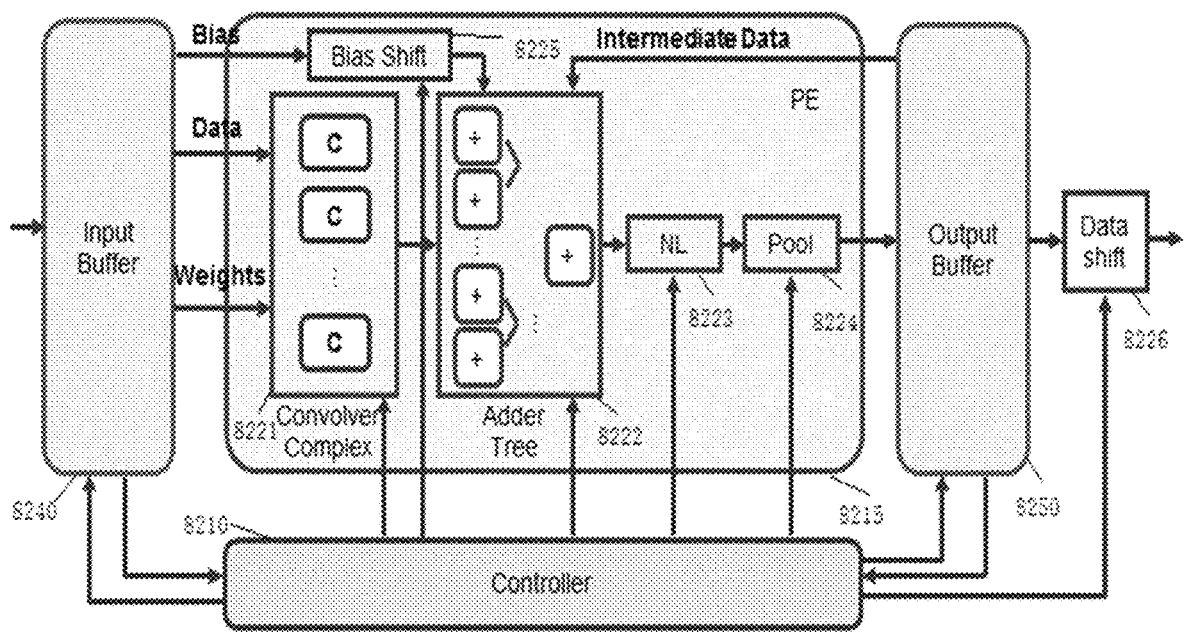
FIGS. 8B and 8C show more details of the programmable logic module of FIG. 8A.
Figure 8C:
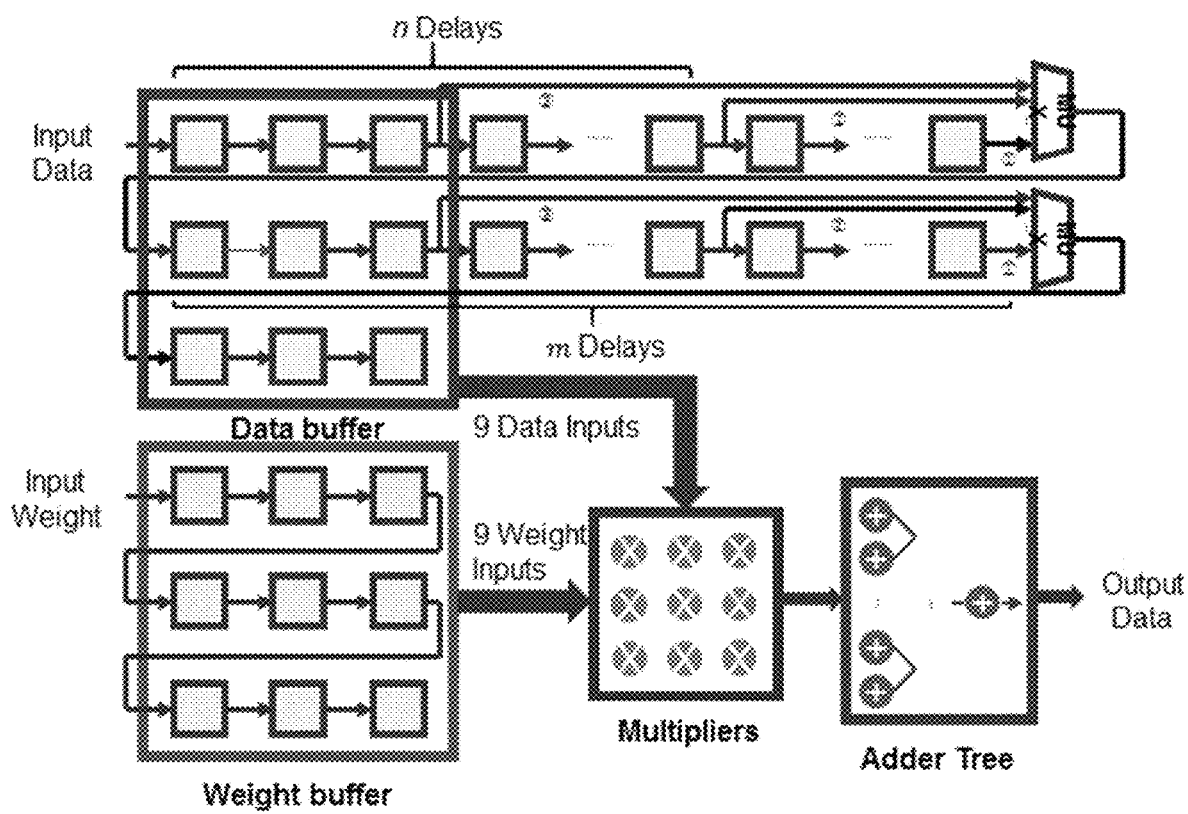

FIGS. 8A through 8C shows the hardware design for implementing ANN (e.g., CNN) according to one embodiment of the present invention, for example, the proposed ANN accelerator as shown in FIG. 4B.

Previous ANN accelerator designs can be generally classified into two groups: the first group focuses on the computing engine and the second group aims to optimize the memory system.

Referring to FIGS. 8A through 8C, it proposes a CPU+ FPGA heterogeneous architecture to accelerate ANNs.

FIG. 8A shows an example functional overview of the proposed system architecture.

The whole system can be divided into two parts: the Programmable Logic (PL) 8200 and the Processing System (PS) 8100.

PL is the FPGA chip, on which we place the Computing Complex 8220, On-chip Buffers 8240, 8250, Controller 8210, and DMAs 8230.

The Computing Complex 8220 consists of Processing Elements (PEs) 8215 which take charge of the majority of computation tasks in CNN, including CONV layers, Pooling layers, and FC layers.

On-chip buffers include input buffer 8240 and output buffer 8250, which are used prepare data to be used by PEs and store the results.

Controller 8210 fetches instructions from the external memory and decodes them to orchestrate all the modules except DMAs on the PL.

DMAs 8230 are working for transferring data and instructions between the external memory on the PS side and On-chip Buffers on the PL side.

PS consists of general-purpose processors 8110 and the external memory 8120.

The external memory 8120 stores all the ANN model parameters, data, and instructions are stored.

Processors (CPU) 8110 run bare-metal programs and help to orchestrate the whole inference phase by configuring the DMAs.

Further, it is desirable to realize Softmax function on CPU considering that its FPGA implementation will bring inevitable design overhead with little performance improvement since this function is called only in the last layer of the whole CNN.

According to the ANN accelerator shown in FIG. 8A, the complete inference process of an image with the proposed ANN accelerator consists of three steps that are executed in sequence: data preparation, data processing, and result output.

Data Preparation. In this phase, all the data needed in the computation including image data, model data, and control data are stored in the external memory. Control data includes the Buffer Descriptors (BD) used by DMAs and instructions used by Controller. So far the image data is not obtained from the camera.

Data Processing. When all the data are prepared, CPU host starts to configure DMAs with the BDs that are pre-stored in the external memory. The configured DMA loads data and instructions to the controller, triggers a computation process on PL. Each time a DMA interrupt is asserted, CPU host adds up the self-maintained pointer address for each DMA's BD list and configures them with new BDs. This phase works until the last BD has been transferred.

Result Output. After receiving the interrupt of the last BD from DMA, the processor host applies Softmax function to the final results from PEs, and output the results to UART port.

FIG. 8B shows the architecture of the PE 8215 in more details and other modules involved.

A PE consists of five parts, including the Convolver Complex 8221, the Adder Tree 8222, the Non-Linearity module 8223, the Max-Pooling module 8224, and the Bias Shift 8225, 8226.

As shown in FIG. 8C, for Convolver Complex 8221, it proposes to employ the classical line buffer design. (See B. Bosi, G. Bois, and Y. Savaria, "Reconfigurable pipelined 2-d convolvers for fast digital signal processing".) When Input Data goes through the buffer in row-major layout, the line buffer releases a window selection function on the input image. Thus the selected window followed by multipliers and an adder tree will compute the convolution result, one data per cycle.

Since the bottleneck of FC layers appears at the bandwidth, we use this module to compute matrix-vector multiplication for FC layers even the efficiency is not good. To realize this function, we set the delay of each line of the line buffer the same as the kernel size by using a MUX at the end of each line. In the proposed implementation, the kernel size is 3. When Input Data goes through the buffer, it gets a totally new vector every 9 cycles in the selected window and do a vector inner product. Thus a convolver can do a matrix multiplied by a vector of size 9.

As shown in FIGS. 8B and 8C, Adder Tree (AD) 8222 sums all the results from convolvers. It can add the intermediate data from Output Buffer or bias data from Input Buffer if needed.

As shown in FIG. 8B, Non-Linearity (NL) module 8223 applies non-linear activation function to the input data stream. Said NL function might be a ReLU.

As shown in FIG. 8B, Max-Pooling module 8224 utilizes the line buffers to apply the specific 2×2 window to the input data stream, and outputs the maximum among them.

As shown in FIG. 8B, Bias Shift module 8225 and Data Shift module 8226 are designed to support dynamic quantization. Input bias will be shifted by Bias Shift according to the layer's quantization result.

Based on the quantization proposed in the present application, for example, as shown in FIG. 4A, for a 16-bit implementation, the bias is extended to 32-bit to be added with convolution result. The output data will be shifted by Data Shift and cut back to the original width.

The size of convolutional kernel usually has only several options such as 3×3, 5×5, and 7×7. All the convolutional kernels in the VGG16 model are in 3×3 dimension, and thus in the Convolver Complex, the 2D convolvers are designed for convolution operation only over a 3×3 window.

FIGS. 8A through 8C is merely a functional overview of the hardware structure. The present invention is not limited to the above rigid division of processing system 8100 and programmable logic 8200.

For example, in practical implementations, according to one embodiment of the present invention, the CPU 8110 and the programmable logic 8200 are implemented by one System-On-a-Chip (SOC), for example, Xilinx Zynq SOC. The external memory 8120 is implemented by a separate memory chip, and being coupled to the SOC. However, as the external memory 8120 is controlled by CPU 8110, it is easier to understand that both CPU and external memory consist of a processing system 8100. Said external memory and CPU may communicate via a data & instruction bus.

In addition, the DMA is also implemented on the same SOC. In one embodiment, under the control of CPU, DMA helps communication between the external memory 8120 and programmable logic 8100. Thus, DMA can be considered as a part of the general processing module 8100 as well.

In one embodiment, the DMA communicates with the input buffer and the output buffer via First-In-First-Out (FIFO). Further, the DMA communicates instructions with the controller via FIFO.

Figure 9A:
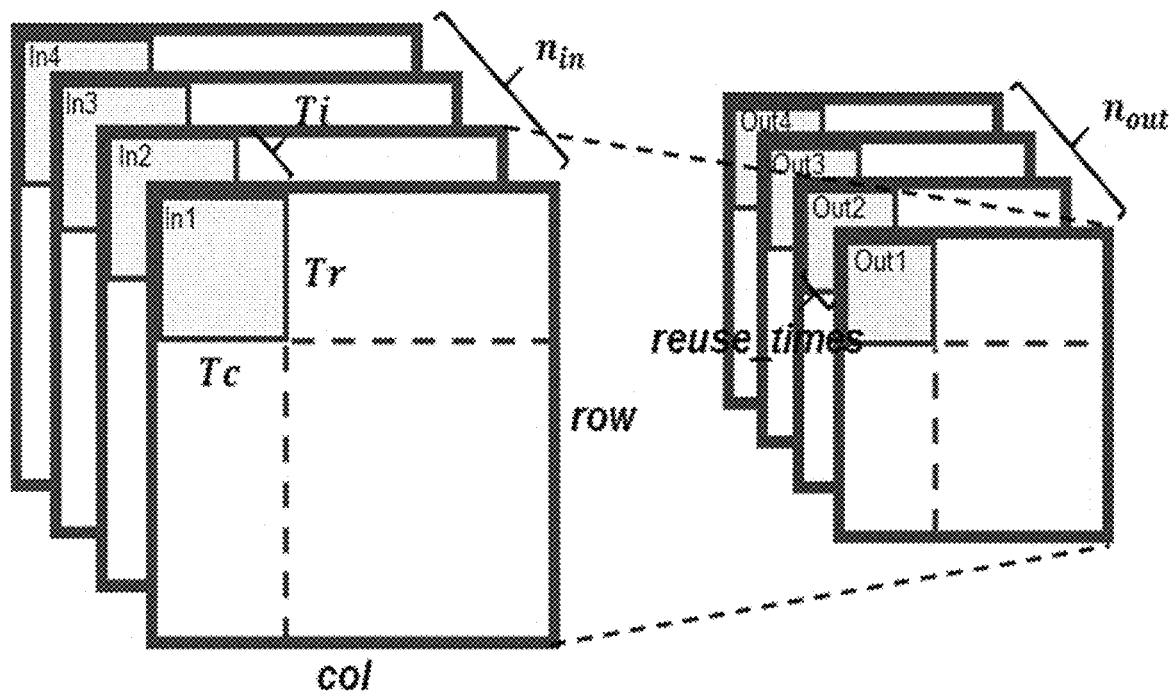
FIGS. 9A through 9C show workload schedule for CONV layers and FC layers when a CNN is implemented on the hardware shown in FIG. 8A.
Figure 9B:
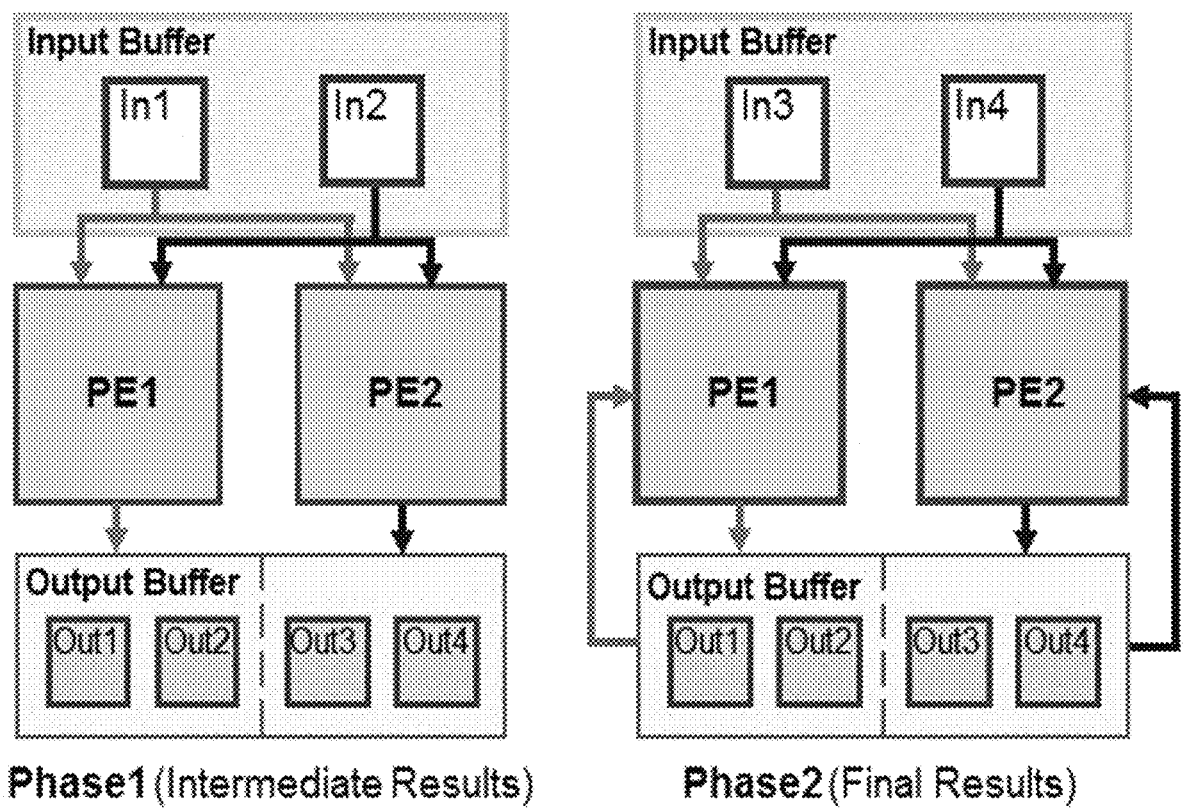
Figure 9C:
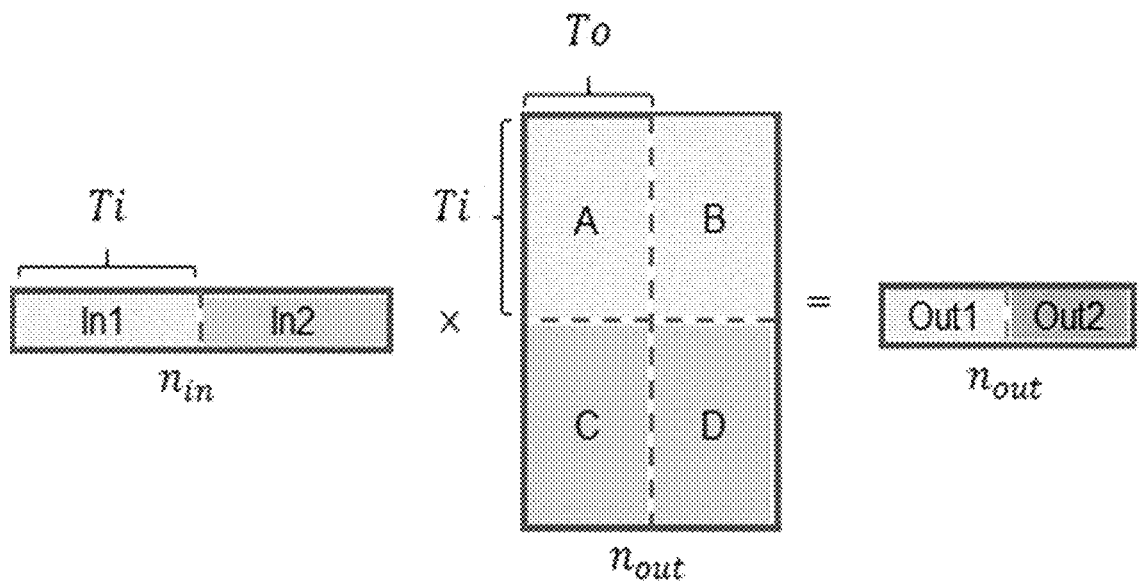

FIGS. 9A through 9C shows the workload schedule for CONV layers and FC layers according to one embodiment of the present invention based on the CNN implemented on the hardware design proposed in FIG. 8A.

Chakradhar et al. pointed out that there are mainly three types of parallelism in CNN workloads: operator-level (fine-grained) parallelism, intra-output parallelism (multiple input features are combined to create a single output), and inter-output parallelism (multiple independent features are computed simultaneously).

In our implementation, all the three types of parallelism are considered. The operator-level parallelism is realized with 2D convolvers. The intra-output parallelism is realized with multiple convolvers working simultaneously in each PE. The inter-output parallelism is realized by placing multiple PEs.

Due to limited on-chip memory, tiling is necessary for CNNs.

In one embodiment, for tiling in CONV layers, it tiles each input image by the factor Tr (Tc) in row (column). And we tile the input (output) feature maps $n_{in}$ ($n_{out}$) by the factor Ti (To).

For FC layers, it tiles each matrix into tiles of Ti×To. For reuse, the times of each input tiled block (vector) to be reused is reuse times.

FIGS. 9A and 9B show how this workload schedule mechanism applies to CONV layers.

FIG. 9C show how this workload schedule mechanism applies to FC layers.

In each computation phase, the Controller decodes a 16-bit instruction to generate control signals for on-chip buffers and PEs. The instruction comprises the signals as shown in Table 3.

Referring to Table 3, Instructions 1-4 are briefly explained as follows.

Instruction 1 commands Input Buffer to load all the needed data, which is distinguished by the Phase Type signal. PE En enables two PEs working in parallel. As Ti=2, Pic Num is set as 2. Tile Size is set as the defined Tr. Layer Type defines the layer type as CONV layer. All the other signals are useless in this phase.

Instruction 2 starts calculating the four tiled blocks in the output layer. Since they are all intermediate results, Pool and NL modules are bypassed. Bias will be added in this phase only once. And Bias Shift specifies the shift configuration for bias data. Output Buffer will only collect the intermediate data and not write to anywhere.

In instruction 3, Write En is set as "PE" to command Output Buffer to send the intermediate results back to the PEs. Bias is no longer added, and thus Zero Switch is set to zero. Since all the data generated in this phase is the final results, Pool and NL Bypass are disabled to let data from AD enter these two modules in sequence.

In the last instruction 4, supposing this CONV layer is the last layer, then no module is working in PE. Write EN is set as "DDR" to command the Output Buffer to write results back to the external memory. Result Shift is set to shift the results data as we want. This phase is distinguished by Controller by setting Phase Type as last.

Figure 10:
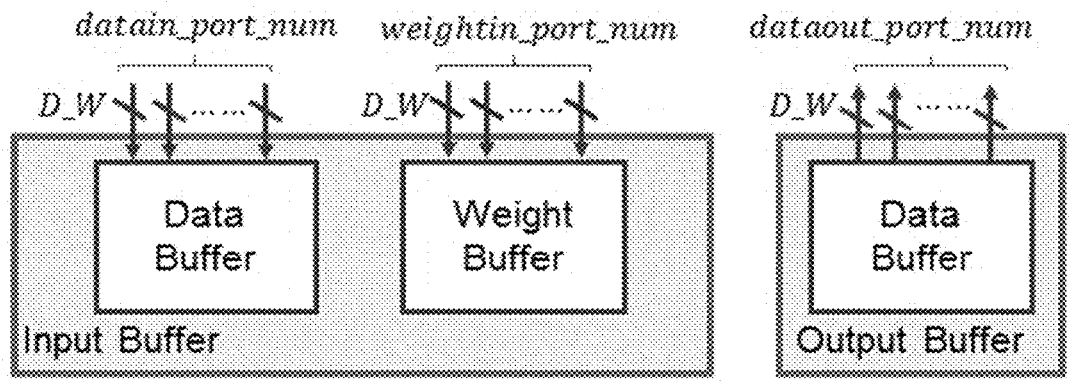
FIG. 10 shows a buffer structure according to one embodiment of the present invention as shown in FIG. 8A.

Referring to FIG. 10, it shows an example of the memory system design which aims to feed the PEs with data efficiently. First the designs of buffers are introduced. After that, the data arrangement mechanisms for CONV and FC layers are presented.

As shown in FIG. 10, there are two on-chip buffers on the PL side, the Input Buffer and the Output Buffer.

The Input Buffer stores the bias, image data, and weights.

The Output Buffer saves the results generated from PE and offers intermediate results to the PEs at proper time.

For simplicity of illustration, we define three parameters as shown in FIG. 10 datain_port_num. The maximum amount of data that can be transferred by DMA each cycle.

weightin_port_num. The maximum amount of weights that can be transferred by DMA each cycle.

dataout_port_num. The maximum amount of results that can be transferred by DMA each cycle.

In CONV layers, the total amount of weights needed in each phase is far less than that of image data, while in FC layers, the amount of weights is far more than the amount of data in input vectors.

Therefore, it saves the weights of FC layers in data buffer whose capability is larger than weight buffer, and save the input data vector in the weight buffer.

In order to reduce the unnecessary access latency of external memory, we optimize the storage pattern of data in the memory space. The principle is to maximize the burst length of each DMA transaction.

Figure 11:
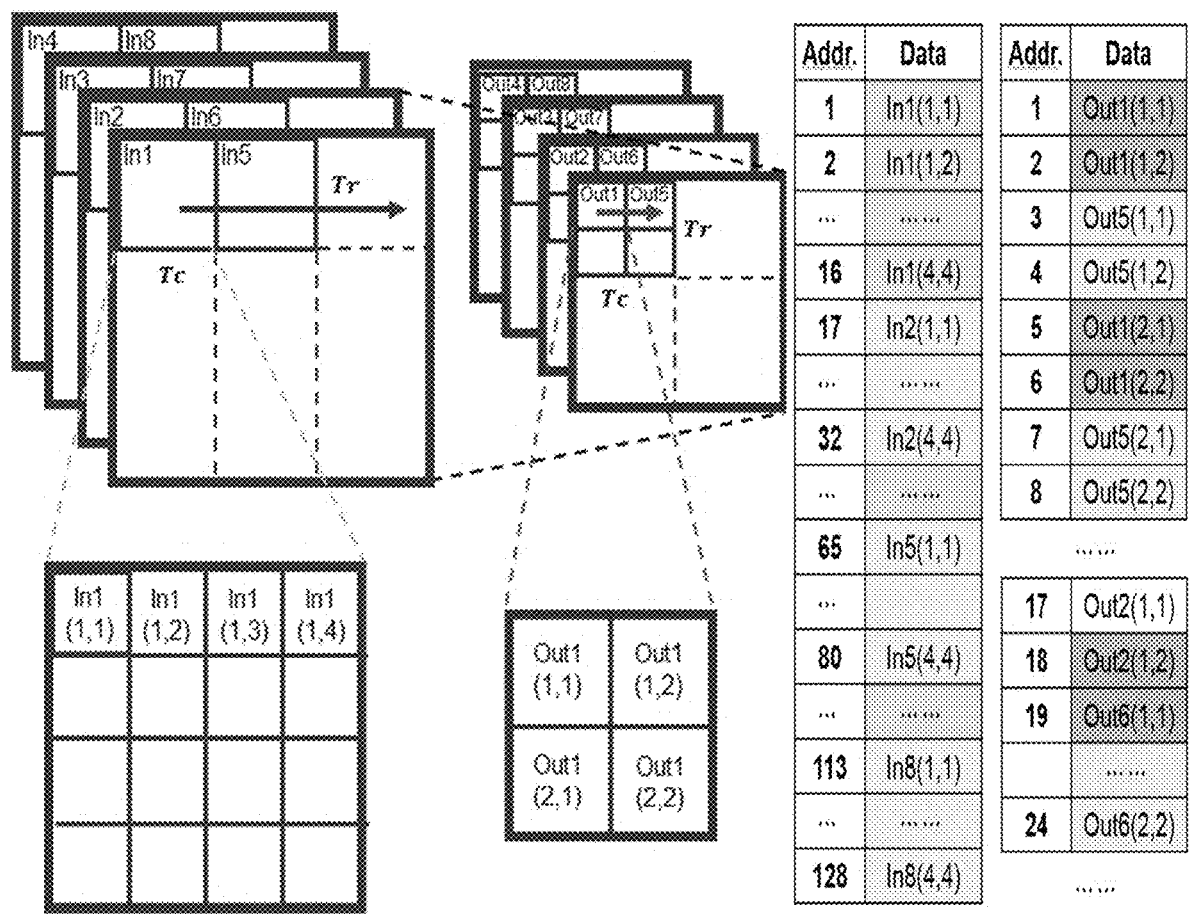
FIG. 11 shows storage pattern for one CONV layer according to one embodiment of the present invention as shown in FIG. 8A.

FIG. 11 shows a brief example of how to organize the input and output data in one CONV layer with max-pooling. It is desired to store the tiles which are at the same relative locations in each picture continuously. Therefore, in each phase, it can load all the input tiles for computation continuously. The output feature maps will be the input feature maps of the next layer, therefore, the same storage pattern applies as well.

There is a slight difference between CONV layers with Pooling and other layers. After a 2×2 pooling, the result is only a quarter of a tile.

In FIG. 11, Out(2,1), instead of Out(1,2), will be calculated after Out(1,1). This means adjacent result tiles are not stored continuously in external memory. If it writes each result tile as soon as it is generated, the burst length will be only Tr=2. This will significantly degrade the utilization of the external memory. To solve this problem, we increase the memory budget on chip. We buffer Out(1,1) to Out(4,1) before generating Out(1,2), then write Out(1,1) and Out(1,2) together. This strategy increases the burst length to Tr×Tc=2.

The speed of computing FC layers is mainly restricted by the bandwidth. In this manner, using specific hardware to accelerate FC layers is not effective. Considering this, the proposed system uses the Convolver Complex in one of the PEs to do the computation for FC layers. In this case, we need to fully utilize the bandwidth of the external memory with the current PL structure.

In our proposed system, it assigns a buffer of length 900, the same as Tr×Tr to each of the 64 Compute Complex in one PE. The buffers are filled one by one when computing CONV layers. To reduce extra data routing logic for filling buffers while keep a long burst length when fetching data for computing FC layers, it arranges the weight matrix in the external memory. It first divides the whole matrix with blocks of 64×9 columns and 100 rows such that one block can be processed in a phase.

Figure 12B:
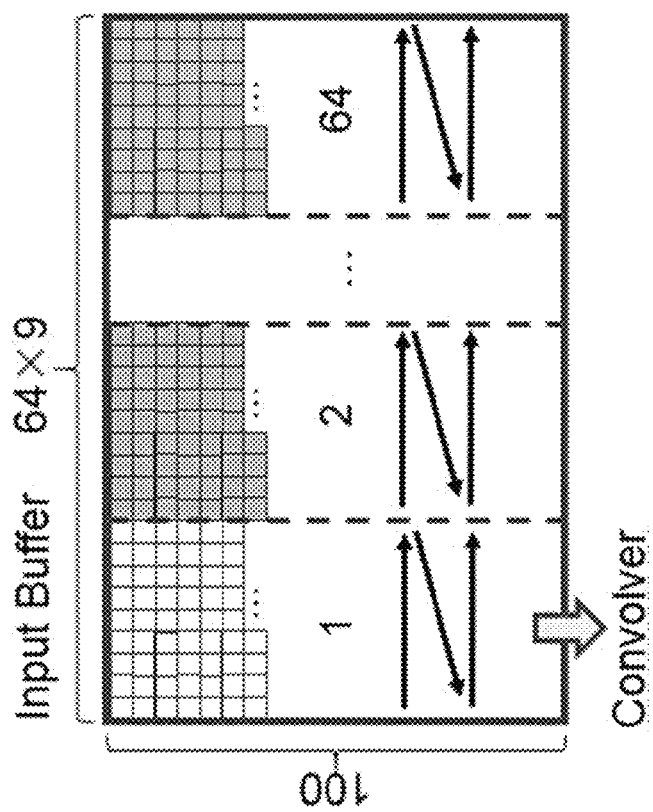
FIGS. 12A and 12B shows data arrangement in external memory according to one embodiment of the present invention as shown in FIG. 8A.
Figure 12A:
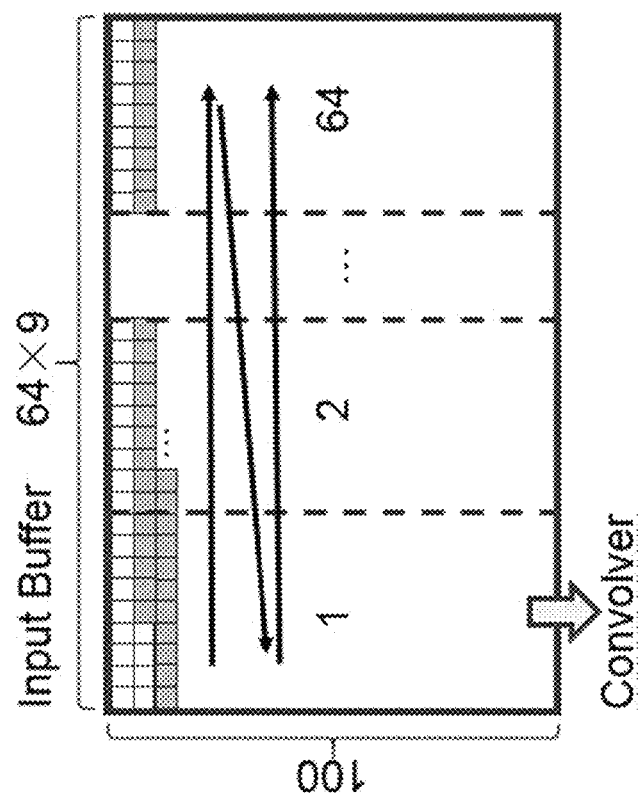

In each block, the data is arranged as shown in FIG. 12B. Without data arrangement for FC layers, as shown in FIG. 12A, we need 64×100 DMA transactions to load one block while the burst length is just 9.

By arranging the data following FIG. 12B, it needs just one DMA transaction to load the whole block and the long burst length ensures a high utilization of the bandwidth of external memory.

Figure 13:
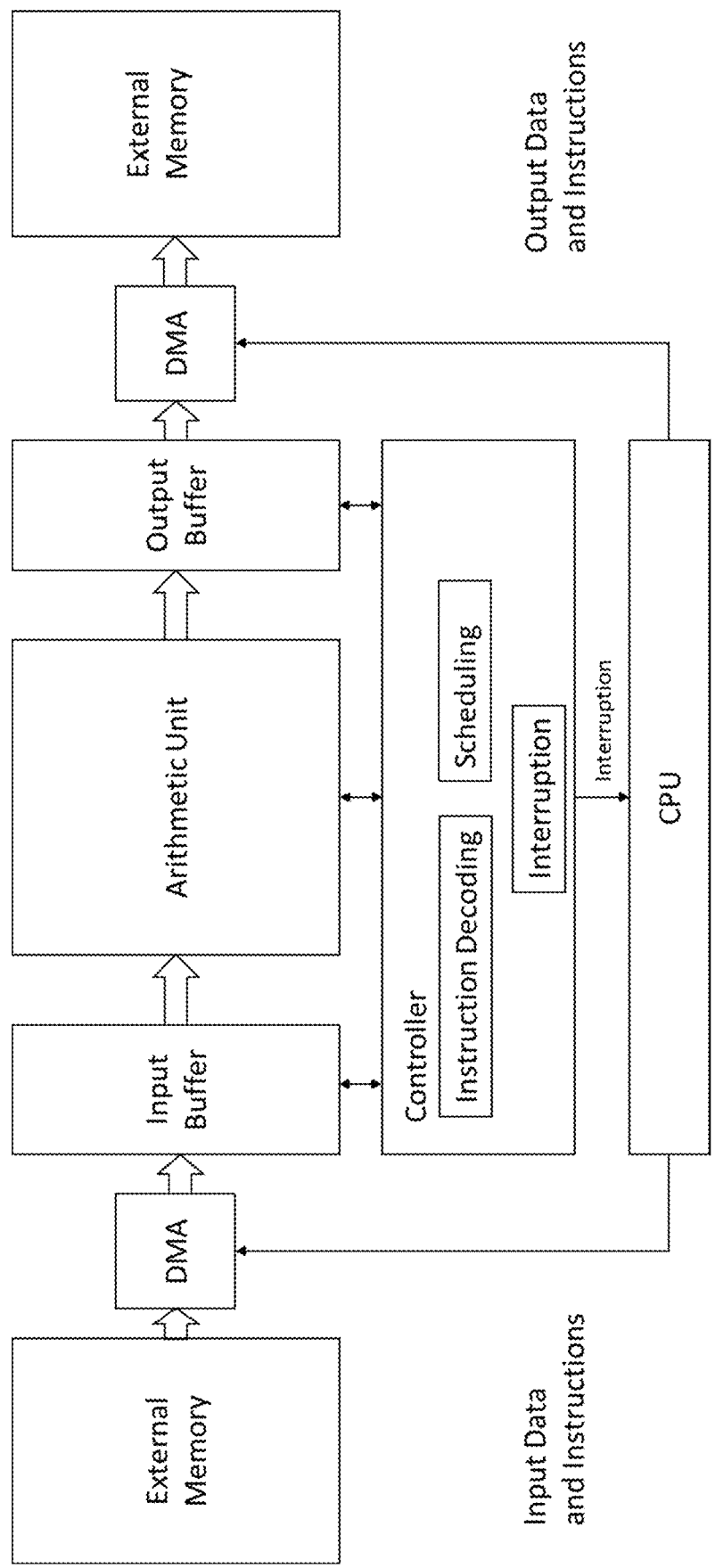
FIG. 13 shows another example of a hardware accelerator for implementing a CNN according to another aspect of the present invention, showing more details of the programmable logic module.

FIG. 13 shows a hardware design for ANN according to another embodiment of the present invention, in particular, disclosing more details of the controller 8210 of FIGS. 8A and 8B.

FIG. 13 shows the hardware design of the proposed ANN accelerator from the perspective of signal flow.

Input instructions are read into controller 8210 via input buffer 8240.

Controller 8210 comprises an instruction decoding module for decoding the received instructions into executable instructions.

Controller 8210 also comprises a scheduling module to schedule a plurality of PEs to perform parallel calculations on the basis of the decoded instructions.

In addition, the controller 8210 comprises an interruption module. After certain task is completed, the controller will send an interruption signal to the CPU 8110. CPU 8110 will access DMA with R/W operations in response to the interruption signal.

Specifically, after a round of calculation, the control 8210 returns an interruption signal S1 when the present data will not be cached in the buffer anymore. CPU gets signal S1 and send an instruction to DMA 8230 so as to input data for next round of calculation. The controller 8210 will return a different interruption signal S2 to CPU when the calculation result is available. After receiving interruption signal S2, CPU will send an instruction to DMA 8230 so as to output the calculation results. When the input operation is complete and the output buffer is idle, the controller 8210 will read an instruction from buffer 8240 for subsequent execution.

Thus, by the interruption module, the controller 8210 interacts with CPU.

In an alternative embodiment, the controller further comprises an instruction granularity transforming module (not shown in FIG. 13) for transforming coarse-granularity instruction into fine-granularity instructions. Said transformation might be based on the number of PE in said computing complex. For example, the 4 phases shown in Table 3 are coarse-granularity instructions. It might be transformed into more fine-granularity instructions so as to improve efficiency.

Alternatively, the instruction granularity transforming might be conducted in instruction generating step 720 of FIG. 7, instead of in controller 8210. In this case, the compiling step 415 (e.g. instruction generating step 720) performs instruction granularity transforming in advance. It may simplify the structure of controller 8210 and spare more resources of PL for PEs.

Those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:

1. A method for optimizing an Artificial Neural Network (ANN), said ANN at least comprises convolutional layers CONV 1, CONV 2, . . . CONV n, and fully connected layers FC 1, FC 2, . . . , FC m, wherein n and m are positive integers, said ANN can receive a data set as input and process said data set by said CONV 1, . . . CONV n, FC 1, . . . FC m in sequence and provide a corresponding feature map set as each layer's output, said method comprising:

compressing step for compressing weights of said convolutional layers CONV 1, CONV 2, . . . CONV n, and fully connected layers FC 1, FC 2, . . . , FC m of said ANN, fix-point quantization step for converting floating-point numbers into fixed-point numbers, including:

weight quantization step, for converting weights of said convolutional layers CONV 1, CONV 2, . . . CONV n, and fully connected layers FC 1, FC 2, . . . , FC m of the compressed ANN from floating-point numbers into fixed-point numbers, wherein the numerical range of quantization is dynamically chosen for different layers while remains static in one layer, data quantization step, for converting data of feature map sets j from floating-point numbers into fixed-point numbers, wherein the numerical range of quantization is dynamically chosen for different feature map sets while remains static in one feature map set, wherein said feature map sets j are output by said CONV layers and FC layers of said ANN, compiling step, for compiling said compressed ANN to generate instructions to be executed by an ANN accelerator, so as to implement said ANN on said ANN accelerator, wherein the compiling step is conducted on the basis of the quantized weights of CONV and FC layers of said ANN, and the chosen quantization numerical range for respective feature map sets output by said CONV and FC layers, wherein the step of compressing further comprises a step of pruning, comprising:

(a) initializing said ANN to establish all connections of CONV layers and FC layers, said connections being assigned weights of random values, (b) training said ANN by adjusting weights of CONV layers and FC layers of ANN until the accuracy of ANN reaches a predetermined level, (c) pruning said ANN to prune insignificant connections, said insignificant connections are decided based on a predetermined criteria, (d) fine-tuning said ANN to restore the pruned connections and assigning zero-value weights to these restored connections;

repeating steps (b) to (d), until the accuracy of ANN reaches a predetermined level.

2. The method of claim 1, wherein step (b) comprises using a stochastic gradient descent algorithm to adjust weights of ANN.

3. The method of claim 1, wherein step (c) comprises using at least one of the following as said predetermined criteria:

deciding a connection is insignificant if weight of the connection is zero, or deciding a connection is insignificant if weight of the connection is smaller than a threshold.

4. The method of claim 1, the step of compressing further comprises SVD decomposition of weights matrix W, said weights matrix W corresponds to one of CONV layers and FC layers of ANN, so as to achieve a sparse version of said weight matrix W.

5. The method of claim 1, the step of fix-point quantizing comprises, converting a 64 bit, 32 bit, or 16 bit float-point numbers into a 16 bit, 8 bit or 4 bit fixed-point numbers.

6. The method of claim 1, the step of weight quantization further comprises:

$$n = \sum_{i=0}^{bw-1} B_i \cdot 2^{-f_l} \cdot 2^i$$

using the above expression to denote a fixed-point number representing the weights of the ANN, wherein bw is the bit width of the number, $f_l$ is the fractional length which can be negative fraction, deciding the optimal $f_l$ for weights in each layer of the CONV layers and FC layers.

7. The method of claim 6, wherein the step of deciding the optimal $f_l$ comprises:

estimating the floating-number range of weights of one layer, designating an initial value for $f_l$, searching for an optimal $f_l$ in the adjacent domains of the initial value based on the following calculation:

$$f_l = \underset{f_l}{\operatorname{argmin}} \sum |W_{float} - W(bw, f_l)|$$

wherein W is the weight matrix of one layer, W (bw, $f_l$) represents the fixed-point format of W under the given bw and $f_l$.

8. The method of claim 6, wherein the step of deciding the optimal $f_l$ comprises:

estimating the floating-number range of weights of one layer, designating an initial value for $f_l$, searching for an optimal $f_l$ in the adjacent domains of the initial value based on the following calculation:

$$f_l = \underset{f_l}{\operatorname{argmin}} \sum \left| \sum k_i |W_{float_i} - W(bw, f_l)_i| \right|$$

wherein W is the weight matrix of one layer, W (bw, $f_l$) represents the fixed-point format of W under the given bw and $f_l$, i represents one bit out of bw bits, $k_i$ represents the weight of said bit i.

9. The method of claim 1, the step of data quantization further comprises:

$$n = \sum_{i=0}^{bw-1} B_i \cdot 2^{-f_l} \cdot 2^i$$

using the above expression to denote a fixed-point number representing the data of feature map, wherein bw is the bit width of the number, $f_l$ is the fractional length which can be negative fraction, deciding the optimal $f_l$ for data in each feature map set output by the CONV layers and FC layers of the ANN.

10. The method of claim 9, wherein the step of deciding the optimal $f_l$ comprises:

estimating the floating-number range of data of one feature map set, designating an initial value for $f_l$, searching for an optimal $f_l$ in the adjacent domains of the initial value based on the following calculation:

$$f_l = \underset{f_l}{\operatorname{argmin}} \sum |x^+_{float} - x^+(bw, f_l)|$$

wherein $x^+ = A \cdot x$, A represents the operation applied by one of the CONV layers and FC layers of the ANN, x represents the input of one layer, $x^+$ represents the output of said layer.

11. The method of claim 9, wherein the step of deciding the optimal $f_l$ comprises:

estimating the floating-number range of data of one feature map set, designating an initial value for $f_l$, searching for an optimal $f_l$ in the adjacent domains of the initial value based on the following calculation:

$$f_l = \underset{f_l}{\operatorname{argmin}} \sum \left| \sum_N k_i |X^+_{float_i} - X^+(bw, f_l)_i| \right|$$

wherein $x^+ = A \cdot x$, A represents the operation applied by one of the CONV layers and FC layers of the ANN, x represents the input of one layer, $x^+$ represents the output of said layer, i represents one bit out of bw bits, $k_i$ represents the weight of said bit i.

12. The method of claim 1, the fixed-point quantization further comprises:

conducting weight quantization for all CONV layers and FC layers of the ANN;

on the basis of all the quantized CONV layers and FC layers, conducting data quantization for each feature map set.

13. The method of claim 1, the fixed-point quantization further comprises: performing weight quantization and data quantization in an alternating manner, including:

conducting weight quantization for said CONV layers and FC layers one layer by one layer in sequence, and after conducting weight quantization for the present layer of said CONV layers and FC layers, before conducting weight quantization for next layer of said CONV layers and FC layers, conducting data quantization of feature map set output from said present layer.

14. The method of claim 1, wherein said fixed-point quantization further comprises:

receiving a bit width bw from the ANN accelerator;

converting floating-point numbers into fixed-point numbers of said bit width bw.

15. The method of claim 1, wherein the compiling step further comprises:

serializing step, for serializing the CONV layers and FC layers of ANN in sequence;

tiling step, for tiling the input data based on the computation complexity of each layer of said ANN, computation and memory resources of said ANN accelerator;

data reusing step, for reusing the tiled data in operations of CONV layers and FC layers;

instruction generating step, for deciding data to be loaded and operations to be conducted on the basis of the tiling and data reusing steps, and generating instructions to be executed by said ANN accelerator.

16. The method of claim 15, wherein the data reusing step further comprising:

loading the tiled data into buffers of said ANN accelerator, reusing said tiled data loaded in buffers for convolutional operations in relation to the tiled data.

17. The method of claim 15, the instruction generation step further comprising:

transforming a coarse-grained instruction into fine-grained instructions on the basis at least one of the following design parameters: number of PEs (Processing Element) in the accelerator, number of convolvers in each PE, size of convolver.

18. The method of claim 1, wherein the tiling step further comprising:

tiling the input data by factors Tr, Tc in row and column, wherein Tr and Tc are decided based on computation and memory resources of said ANN accelerator.

19. The method of claim 18, wherein the computation and memory resources of said ANN accelerator includes at least one of the following: number of PEs (Processing Element) in the accelerator, number of convolvers in each PE, or size of convolver.

20. The method of claim 1, wherein the ANN receives a benchmark data set as input of said ANN in order to perform the fixed-point quantization step.

* * * * *